United States Patent
Gotsman et al.

(10) Patent No.: US 12,276,515 B2
(45) Date of Patent: Apr. 15, 2025

(54) METHOD FOR COMPUTING FASTEST ROUTE ON ROAD NETWORKS WITH DYNAMIC TRAFFIC INFORMATION

(71) Applicants: New Jersey Institute of Technology, Newark, NJ (US); Max-Planck-Gesellschaft zur Förderung der Wissenschaften e.V., Munich (DE)

(72) Inventors: Craig Gotsman, Jersey City, NJ (US); Renjie Chen, Saarbrucken (GB)

(73) Assignees: New Jersey Institute of Technology, Newark, NJ (US); Max-Planck-Gesellschaft zur Förderung der Wissenschaften e.V. (DE)

(*) Notice: Subject to any disclaimer, the term of this patent is extended or adjusted under 35 U.S.C. 154(b) by 1463 days.

(21) Appl. No.: 16/791,596

(22) Filed: Feb. 14, 2020

(65) Prior Publication Data
US 2020/0264002 A1    Aug. 20, 2020

Related U.S. Application Data

(60) Provisional application No. 62/805,384, filed on Feb. 14, 2019.

(51) Int. Cl.
*G01C 21/34*    (2006.01)
*G06F 16/27*    (2019.01)
(Continued)

(52) U.S. Cl.
CPC ....... *G01C 21/3492* (2013.01); *G06F 16/278* (2019.01); *G06F 16/9027* (2019.01); *G06F 16/9537* (2019.01)

(58) Field of Classification Search
CPC ............ G01C 21/3492; G01C 21/3446; G06F 16/278; G06F 16/9027; G06F 16/9537
See application file for complete search history.

(56) References Cited

U.S. PATENT DOCUMENTS 7,936,284 B2    5/2011   Levine et al.
8,068,973 B2    11/2011  Yamane et al.
(Continued)

OTHER PUBLICATIONS

Abraham, et al.. "A Hub-Based Labeling Algorithm for Shortest Paths in Road Networks." Lecture Notes in Computer Science, Dec. 2010, In Proc. of ISEA, Dec. 2010, pp. 230-241, vol. 6630. Springer, Berlin, Heidelberg.
(Continued)

*Primary Examiner* — Richard M Camby
(74) *Attorney, Agent, or Firm* — Lerner David LLP

(57) ABSTRACT

A method and system that utilizes an admissible heuristic to determine the fastest-path between two points on a road map is disclosed. The method and system are based in part on a set of separators disposed on the map and represented by line segments, either independent or organized into hierarchical tree structures and based on recursive spatial subdivision. A preprocessing step computes a vector of values per road junction based on the separators that is then stored with the map and used to efficiently compute a high-quality heuristic to be used at a query stage. The heuristic scales well to any map size, resulting in a very efficient determination of fastest-path queries between points at all distances. The implementation is economically feasible and the resulting query speeds are significantly faster than other known heuristics and other state-of-the-art systems used for computing fastest-paths on maps.

8 Claims, 36 Drawing Sheets
(33 of 36 Drawing Sheet(s) Filed in Color)

(51) Int. Cl.
  *G06F 16/901* (2019.01)
  *G06F 16/9537* (2019.01)

(56) References Cited

U.S. PATENT DOCUMENTS

| | | | | |
|---|---|---|---|---|
| 8,086,403 | B2 * | 12/2011 | Ishikawa | G01C 21/3492 340/995.13 |
| 9,109,909 | B2 * | 8/2015 | Schilling | G01C 21/3453 |
| 11,069,231 | B2 * | 7/2021 | Eilertsen | G08G 1/0112 |
| 2014/0163872 | A1 * | 6/2014 | Schilling | G01C 21/3446 701/527 |
| 2018/0342030 | A1 * | 11/2018 | Magleby | G06F 17/10 |

OTHER PUBLICATIONS

Barer, "Suboptimal Variants of the Conflict-Based Search Algorithm," Ben-Gurion University of the Negev, Faculty of Engineering Sciences, Department of Information Systems Engineering; May 12, 2014, Pages i-56.

Bast, et al., "Route Planning in Transportation Networks," In Algorithm Engineering: Selected Results and Surveys (L. Kliemann and P. Sanders, Eds.), Springer, Jan. 8, 2014, pp. 19-80.

Chen, et al., "A Scalable Heuristic for Fastest-Path Computation on Very Large Road Maps," arXiv preprint arXiv:1812.07441, Dec. 18, 2018, 12 pages.

Chen, et al., Efficient Fastest-Path Computations in Road Maps. arXiv preprint arXiv:1810.01776. Oct. 2, 2018, pp. 1-17.

Chow, A Graph Search Heuristic for Shortest Distance Paths. United States. Department of Energy, Mar. 29, 2005, 6 pages.

Dijkstra, "A Note on Two Problems in Connexion with Graphs," Numerische Mathematik, Jun. 11, 1959, vol. 1, No. 1, 3 pages.

Fredman, et al., "Fibonacci Heaps and Their Sses in Improved Network Optimization Algorithms, " Journal of the ACM (JACM). Jul. 1, 1987, pp. 595-615, vol. 34, No. 3.

Geisberger, et al., "Exact Routing in Large Road Networks Using Contraction Hierarchies," Transportation Science, Aug. 5, 2012, pp. 388-404, vol. 46, No. 3.

Goldberg, et al., Computing the Shortest Path: A Search Meets Graph Theory. InProceedings of the Sixteenth Annual ACM-SIAM Symposium on Discrete Algorithms, Jan. 23, 2005, pp. 156-165, Society for Industrial and Applied Mathematics.

Hart, et al., "A Formal Basis for the Heuristic Determination of Minimum Cost Paths," IEEE Transactions on Systems Science and Cybernetics, Jul. 1968, pp. 100-107, vol. 4, No. 2.

Rayner, et al. "Euclidean Heuristic Optimization," Twenty-Fifth AAAI Conference on Artificial Intelligence, Aug. 4, 2011, 6 pages.

Shmoulian et al., Roadmap-A *: An Algorithm for Minimizing Travel Effort in Sensor Based Mobile Robot Navigation. InProceedings. 1998 IEEE International Conference on Robotics and Automation, May 20, 1998, vol. 1, pp. 356-362, IEEE.

https://www.openstreetmap.org retrieved from internet on Feb. 24, 2020, 1 page.

* cited by examiner

```
Preprocess(G, k)
for each v ∈ G
        code(v) := ( );   // empty binary code
        cost(v) := ( );   // empty cost vector
end
Code(G, 1, k, x_min, x_max);  // x_min and x_max are the x-extents of G
```

```
Code(G, d, d_max, x_1, x_2)  // generate codes and costs for each vertex of G up to depth d_max
if d ≤ d_max
```
$$x_c = \frac{(x_1 + x_2)}{2};$$
```
        F := edges of E cut by the line x = x_c;
        S := right endpoints of edges in F ;   // S is separator
        partition G to (L, S, R);
        for each v ∈ G
                code(v) := concat(code(v), x(v) ≤ x_c ? 0 : 1);
                cost(v) := concat(cost(v), c(v, S));
        end
        Code(L, d + 1, d_max, x_1, x_c);
        Code(R ∪ S, d + 1, d_max, x_c, x_2);
end
```

Fig. 3

```
heuristic(s, t, d)
h := 0;
for i := 1 to d
   if code(s, i) == code(t, i)   // code(s, i) is the i'th bit of code(s)
       h := max(h, |cost(s, i) − cost(t, i)|);
   else
       h := max(h, cost(s, i) + cost(t, i));
       return h;
   end
   return h;
end
```

Fig. 4

METHOD FOR COMPUTING FASTEST ROUTE ON ROAD NETWORKS WITH DYNAMIC TRAFFIC INFORMATION

CROSS REFERENCE TO RELATED APPLICATION

This application claims priority from U.S. provisional application No. 62/805,384 filed Feb. 14, 2019, the disclosure of which is hereby incorporated herein by reference.

FIELD OF USE

The present application discloses a method of determining the fastest travel route in large road networks under dynamic traffic conditions. More particularly, the present application relates to utilization of graph separators of the road network in a preprocessing stage and minimal data storage usage to very efficiently determine the fastest travel route in an online query as compared to current state-of-the-art systems.

BACKGROUND OF THE INVENTION

Currently there is a growing demand for computer-based navigation systems that are able to provide end users, such as vehicle drivers and other travelers, with various navigating functions and features. For example, some navigation systems are able to determine an optimal route to travel by driving and/or walking between two physical locations in a geographic region. Using input from the end user, and optionally from equipment that can determine the end user's physical location (such as a global positioning system), a navigation system can identify and examine various routes between two locations (the source point and the target point) in the geographic region to determine an optimal route between the two locations. An optimal route is typically the fastest one, namely that which enables the end user to travel in the least amount of time. Online fastest-path queries for routes in a very large road map augmented with dynamic traffic information is an increasingly important primitive in modern transportation and navigation systems, thus very efficient computation of these paths is critical for system performance and throughput.

Typical navigation systems provide the end user with information about the route in the form of instructions that identify the maneuvers required to be taken by the end user to travel from the starting location to the destination location. The navigation system may be located in an automobile or at an office remote from the end user, and the instructions may take the form of textual and/or audio instructions that are provided to the end user. Some navigation systems are capable of providing detailed moving map displays outlining the route between locations, the types of maneuvers to be taken along the route, locations of certain types of features or points of interest, and landmarks.

Current state-of-the-art methods for fastest route computation include, for example, the so-called "Contraction Hierarchy" (CH) method that requires a significant amount of complex map data. This type of method is not practical because when traffic conditions change additional processing and data must be used.

Other present navigation systems include navigation application programs and use one or more detailed databases. The detailed databases include data representing the road networks in a geographic region, including the roads and intersections in the region and information about the particular roads and intersections, such as one-way streets, turn restrictions at intersections, speed limits along the roads, street names of the various roads, address ranges along the various roads and so on. These relatively static databases are complemented with dynamic data detailing the current traffic situation on the roads, which affect the maximal speeds attainable on the roads, and may affect navigation. Further, the data may include information about points-of-interest such as restaurants and hotels and gas stations. Presently, the collection of such geographic data and the provision of such data in a computer-usable database format involve an enormous amount of data, and a very large database facility to process and store the information.

Present navigation systems may also use data represented in detailed databases to answer online queries. A typical query asks for a route optimized for travel time or distance between designated physical locations. To do this action, the navigation application program may exhaustively search the data that represents the road networks in a particular geographic region. Accordingly, the navigation application program may calculate and subsequently compare many possible routes to determine the optimal solution. This calculation and route comparisons takes a lot of processing time and data drain. The response time to a query lengthens as the data and number of possible routes increase. This further delays response time as the processor probes through all the data stored.

Accordingly, there is a need in the art to provide for an optimized route on a roadmap that utilizes less data and can be processed quicker than current state of the art technology. Online fastest-path queries between two points in a very large road map augmented with dynamic traffic information is an increasingly important primitive in modern transportation and navigation systems, thus very efficient computation of these paths is critical for system performance and throughput.

There also still exists a critical need for low-complexity low-power architecture capable of providing reliable and optimized route information and subsequent transmission over a communication link of detailed travel instruction without delayed response and use of large amount of data and/or storage.

SUMMARY OF THE INVENTION

Compared to current methods, the present disclosure fulfills the above criteria and provides additional benefits that state of the art systems cannot provide. The current method and related system allows significantly more efficient computation of fastest travel routes in large road networks under dynamic traffic conditions. This is extremely important for online navigation systems. Moreover, compared to previous attempts, the present disclosure offers high-speed results and hence quicker responses and data communication to users, thus decreasing latency. A preprocessing step is utilized that is required only once depending on the implementation. The system and method allows dynamic traffic conditions and utilizes less data storage and quicker response times to a user's query.

The present disclosure provides very efficient determination of fastest paths in very large road networks. Fastest paths may be determined as minimal-cost paths in a directed abstract graph, whose edges are weighted with costs. A directed graph (or digraph) is a graph that is made up of a set of vertices connected by edges, where the edges have a direction associated with them. An edge is (together with vertices) one of the two basic units out of which graphs are constructed. Each edge has two (or in hypergraphs, more)

vertices to which it is attached, called its endpoints. Edges may be directed or undirected; undirected edges are also called lines and directed edges are also called arcs or arrows. In a directed graph, an edge may be represented as an ordered pair of its vertices. An edge that connects vertices x and y is sometimes written xy. Costs are determined by amount of time and/or length of the path depending on the embodiment. Traditional minimal-cost path algorithms based on variants of the classic algorithm do not scale well, and as in the worst case may traverse the entire graph. Reduction of the number of traversed graph vertices may be done with the so-called classical A* algorithm that requires a good estimate of a lower bound on the minimal cost between two vertices in the graph. This estimate is called a heuristic. The closer the heuristic is to the true minimal cost—the faster the A* algorithm will run.

The current system and method provides an effective heuristic function for use in the classical A* algorithm. The heuristic function is based on a set of separators for a weighted directed graph. The term "set" for purposes of this specification will mean one or more separators. The graph represents a road network with costs per edge, each cost representing in this embodiment the travel time along each road segment, based on traffic information. The cost of a path in the network is the sum of the costs of the edges along that path.

Graph separators are sets of vertices in the network which, when removed along with edges connected to them, separate the network into two disconnected components. A set of graph separators are identified in a preprocessing stage, that depending on the embodiment only occurs once, and at which minimal costs of every vertex to the separators are computed and stored. The minimal cost is the least costly path from that vertex to any vertex on the separator. During an online query, these values are used to determine an admissible heuristic function for A*. The method is applicable to any minimal-cost problem on graphs, such as shortest path in communication networks, social networks, and road maps. The heuristic based on a set of graph separators is novel and outperforms other heuristics currently in use.

Experimental results demonstrate that the present heuristic provides estimates of the minimal cost which are superior to those of other heuristics. Also, experiments show that when used in the A* algorithm framework, this heuristic can reduce the number of vertices traversed during A* by an order of magnitude compared to other heuristics. Thus the classical A* algorithm is significantly accelerated when computing fastest paths, and a more efficient A* search is possible.

In one aspect, a method and a system is disclosed that allows determination of an effective heuristic for fastest path travel time between two points on a road map. The method and system, called Global Separator Heuristic (GSH), are based on one or more separators of the map. A preprocessing step determines a vector of values per road junction based on the separators that is then stored with the map and used to efficiently compute the heuristic during A*. The method provides a high-quality heuristic resulting in an efficient search for fastest path queries between points at all distances.

In another aspect, a method and a system is disclosed that allows determination of a more effective heuristic compared to the GSH for fastest path travel time between two points on a road map. The method and system, called Local Separator Heuristic (LSH), are based on one or more hierarchical sets of separators of the map represented by multiple binary trees. The domain is subdivided into two halves by a single line segment. Each half is subdivided into two more at each level. Each line segment defines a separator. For each vertex (or road junction) in the domain, costs are stored only to the relevant separators as defined by this structure. At query time, this is used to efficiently compute the heuristic. Compared to GSH, the method scales well to any map size and provides a better quality heuristic with a more efficient search for fastest path queries between points at all distances. Thus, processing speeds are significantly accelerated relative to GSH when using the classical A* algorithm for computing fastest paths. Increased processing speeds are especially significant with travel distance queries that are relatively in the small and medium travel ranges of 50 miles or less, and in high population areas of over 50,000 people.

In another aspect, a method and a system, called QSH (Quadtree Separator Heuristic), is disclosed that allows determination of a more effective heuristic for fastest path travel time between two points on a road map. Here, a quadtree construction is utilized to build a hierarchical set of separators on the map domain. The domain is subdivided into four quadrants by two line segments. Each quadrant is subdivided into four more at each level. Each line segment defines a separator which is partitioned into two segments. For each point (or junction) in the domain, costs are stored to the relevant separator segments as defined by this structure. When computing the heuristic between two points, the minimum of the costs to separator segments common to both points are used. Although additional storage capacity is required for the QSH method as compared to the LSH method, the trade-off is between storage capacity and the quality of the resulting heuristic (thus A* speed) is favorable.

The A* algorithm makes use of a priority queue of graph vertices, where the priority is determined by the heuristic function. Operations on the priority queue may be computationally expensive, thus it is preferred to minimize the number of operations on the queue. During A*, when "expanding" a graph vertex, all vertex neighbors are examined and "pushed" onto the priority queue. A vertex is then "popped" off the priority queue to continue the search. When the heuristic is almost perfect (close to the true minimum cost—approximately less than 1% difference of the true value), the A* search will be close to gradient descent from source to target, and the next node expanded at any given step will be one of the neighbors of the current minimal element of the priority queue. In this case, operations on the priority queue may be saved since there is no need to push this neighboring node on the priority queue only to immediately pop it. Thus, a simple comparison of the neighbors to the minimal element of the priority queue is sufficient to determine if this is the case, and then just push all neighbors which are not the one to be expanded (the one with the smallest cost).

Any combination and/or permutation of the embodiments and objects described are envisioned and within the scope of the invention. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 2A is an example of a top level of a local separator heuristic using two orthogonal directions (trees); FIG. 2B is an example of a two level separator tree heuristic; FIG. 2C is an example of a three-level separator tree heuristic; and FIG. 2D is an example of the binary tree corresponding to the three-level horizontal separator tree shown in FIG. 2C. Each sample vertex (a to e) is labeled with two 3-bit binary codes—one for the vertical separator tree and one for the horizontal separator tree;

FIG. 3 is an exemplary pseudo-code for a preprocessing stage: constructing binary codes and cost vectors for all vertices of graph G based on x-coordinated of the vertices;

FIG. 4 is an exemplary pseudo-code for online computation of the local LSH heuristic estimate of the minimal cost between two vertices s,t∈G based on the top d≤k levels of a separator tree of depth k;

DETAILED DESCRIPTION

Figure 1A:
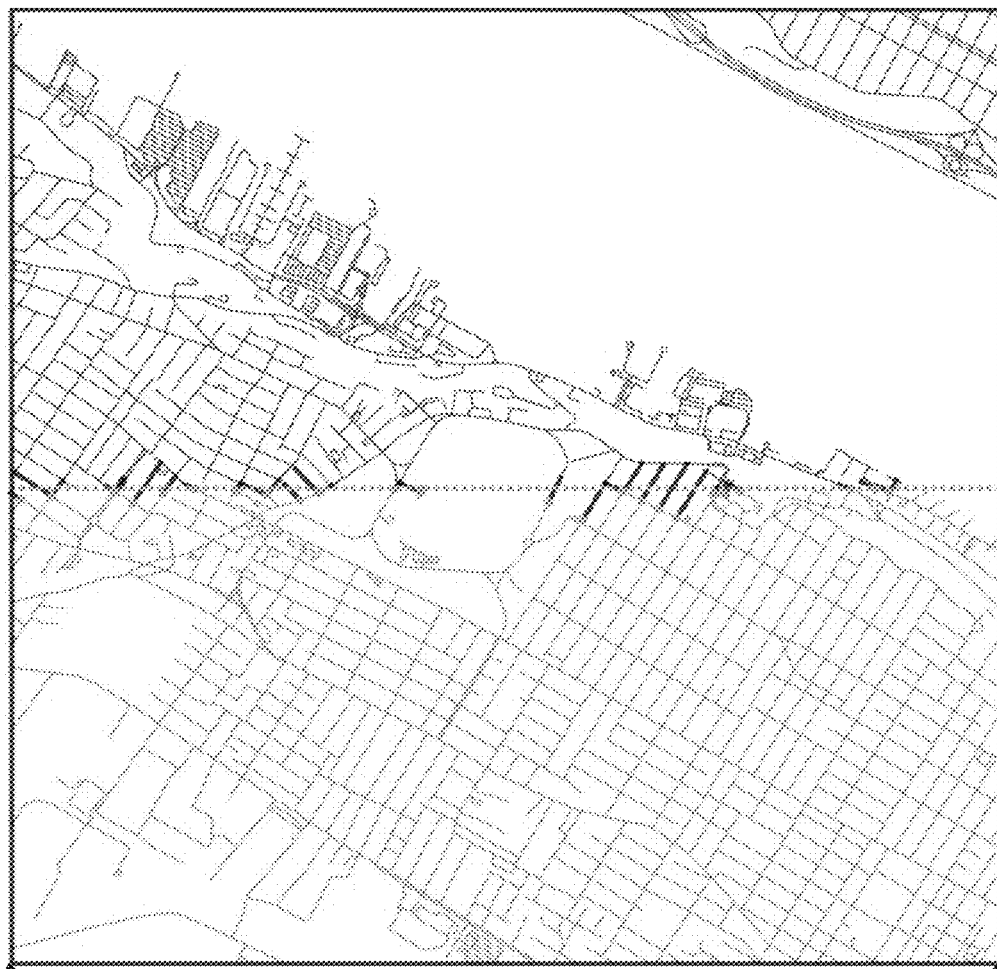
FIGS. 1A-1D illustrate a diagram showing separators of a roadmap of NY generated by vertical (FIGS. 1A-1B) and horizontal (FIGS. 1C-1D) lines, where green vertices are designated component U1, blue vertices are component U2, and large pink vertices are separator vertices S, the vertices of S are the left (top, resp.) endpoint of the black edges intersected by the vertical (horizontal, resp.) dotted pink line in the plane.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Existing computer programs known as "road-mapping" programs provide digital maps, often complete with detailed road networks down to the street level. Typically, a user can input a location and the road-mapping program will display an on-screen map of the selected location. Several existing road-mapping products include the ability to calculate a "best route" between two locations. In other words, the user can input two locations—source and target—and the road-mapping program will compute the travel directions from the source location to the target location, typically along a route that optimizes some measure between the two locations The measure is typically based on distance, travel time, traffic conditions and certain user preferences, such as a speed at which the user likes to drive, or the degree of scenery along the route.

Computing the best route between locations may require significant computational time and resources. Existing road-mapping programs employ variants of a classical method to compute shortest paths. Note that in this sense "shortest" also means "minimal cost" because each road segment may be assigned a cost or weight not necessarily directly related to the road segment's length. By varying the way the cost is calculated for each road, minimal-cost paths can be generated for the quickest, shortest, or preferred routes. In a navigational scenario, depending on the embodiment, the cost of a road segment is usually the travel time along that segment, which depends on traffic conditions. The cost of a route between two points is then the sum of costs of the road segments along that route. A fastest path between two points is the route between the two points whose cost is minimal (among all possible routes). The fastest path is typically what a driver is most interested in when driving to a destination.

Prior fastest path methods, however, is not efficient in practice, due to the large number of map locations and possible paths that are scanned. Instead, many modern road-mapping programs that use heuristic variations including the classical A* algorithm search (also known as heuristic or goal-directed search) in order to "guide" the search for a minimal-cost path in the right general direction fall short of their objective to provide a quick response with minimal data usage and minimimal cost. Such heuristic variations typically involve estimating the minimal cost of paths between intermediate locations and the destination. A good estimate reduces the number of locations and road segments that must be considered by the road-mapping program, resulting in a faster computation of minimal-cost paths. A bad estimate can have the opposite effect, and increase the overall time required to compute these paths. If the estimate is admissible—namely, a lower bound on the cost with certain properties—A* search is guaranteed to find the optimal (minimal-cost) path. The closer these heuristic is to the true path cost, the better A* performs. Previously known heuristics use simple lower-bound estimation techniques such as Euclidean distance between locations, which is suitable only for shortest paths based on distance. Heuristic A* search was modified in the present disclosure.

In heuristic A* search, the following examples explains the challenges and the improvements provided by the present disclosure. Let $G=<V,E,c>$ be a graph representing a road network with vertex set V, edge set $E \subset V \times V$, and a positive cost function on the edges $c:E \to R^+$. The minimal-cost path problem on G is as follows. Given a pair of query points $s,t \in V$, find a path of edges in G from s to t, such that the sum of the costs of these edges is minimal among all possible paths from s to t. This is called a minimal-cost path and in this way it can generalize the function c to express the minimal cost between all pairs of vertices: $c:V \times V \to R^+$.

The classical A* algorithm is a generalization of the classical (and most basic) algorithm, which is notoriously slow. In search of the minimal-cost path from s to t, the algorithm traverses many more graph edges and vertices than those on the actual path. In fact, the complexity of computing the minimal cost from s to the single vertex t is essentially the same as computing the minimal cost from s to all other vertices in the graph. To wit, the time complexity, even after some optimization, is (m+n log n), where m is the number of edges and n the number of vertices in the graph. A* improves on this with the help of an admissible heuristic function $h:V \times V \to R^+$, such that $\forall s,t: h(s,t) \leq c(s,t)$, namely h is a lower bound on $c(s,t)$—the true minimal cost between s and t. The closer h is to c, the faster A* runs, reducing the number of graph edges and vertices traversed during the search for the minimal-cost path. For the trivial h≡0, A* reduces to the algorithm, and for the perfectly informed h=c, A* performs "gradient descent" on c directly from s to t, with no unnecessary search overhead. Ideally, depending on the embodiment, A* with a good heuristic should reduce the overhead of the search to some small constant multiplier of the number of vertices along the optimal path.

Many researchers have sought a good heuristic and failed with partial success. In order for a heuristic to be effective, it must have high quality—namely, approximate the true cost very well. One approach is to assign to every vertex a vector of "coordinates", in effect embedding in some Euclidean metric space. The heuristic distance between s and t is then the Euclidean distance between the embeddings of the two vertices. Computing an effective embedding is not easy. Given an undirected weighted graph, it is possible to compute an "optimal" embedding in d dimensions for this purpose, by solving a semi-definite program (SDP). The accuracy of the heuristic will theoretically improve as d increases. Although computing the embedding is done as a preprocessing step on the graph only once, after which the embedding coordinates are stored (requiring (dn) space complexity, where n is the number of graph vertices) and referred to every time the heuristic is computed, the time complexity of $(dn^3)$ for this preprocessing is prohibitive for very large graphs.

Therefore, the objective is to optimize the tradeoff between 1) the preprocessing time complexity; 2) the space complexity to store the results of the preprocessing; 3) the time complexity of computing the heuristic based on the stored information when A* runs, and 4) the quality (i.e. accuracy) of the resulting heuristic.

Proposed in this present disclosure are a number of admissible heuristics. One, called LSH, is based on a binary tree structure, parameterized by a tree depth k. For this heuristic, the preprocessing time complexity is ($2^k$ log n), the storage space complexity is (kn), the heuristic computation time complexity is (k) and the heuristic quality increases with k. In practice, k is taken to be (log n), thus the time complexity of preprocessing, storage space complexity of the result, and heuristic computation time complexity become (n log n),0(n log n),0(log n), respectively.

Experimentally it was observed that the overhead of computing the minimal-cost path using the LSH heuristic is a small constant factor of the number of vertices along the path, thus, the complexity of computing a minimal-cost path in a road map would be ($\sqrt{n}$ log n), since the number of vertices along a path in a plane graph is typically ($\sqrt{n}$), thereby significantly reducing the complexity of the computation.

Global Separator Heuristic (GSH)

Proposed herein is the construction of heuristics for A* based on graph separators, as follows in its most basic form. Let $S \subset V$ be a separator of G, namely a set of vertices such that its removal, along with the edges connected to the removed vertices, results in V being partitioned into three sets $U_1$, S and $U_2=V-U_1-S$, such that there exist no edges between $U_1$ and $U_2$. This means that S separates between $U_1$, and $U_2$ and the separated graph contains at least two connected components, none of them mixing $U_1$, and U2. For two vertices $s,t \in G$, S separates s and t if $s \in U_1$ and $t \in U_2$ or vice versa. The minimal cost function between two vertices may be generalized to the cost between two subsets of vertices: $c:2^V \times 2^V \to R^+$, by: $c(A,B)=\min_{s \in A, t \in B} c(s,t)$.

Let S be a separator of G and s and t are two vertices of G. The following separator heuristic is admissible, namely is a lower bound on the true minimal cost:

$$h_s(s, t) = \begin{cases} c(s, S) + c(t, S) & \text{if } S \text{ separates } s \text{ and } t \\ |c(s, S) - c(t, S)| & \text{otherwise} \end{cases} \quad (1)$$

Essentially the first case means that if S separates s and t, then the minimal cost between s and t is at least the minimal cost from s to S+the minimal cost from t to S, since any path from s to t must cross S. In the second case, that S does not separate s from t, a different estimate for (s,t) can be obtained using the triangle inequality, a generalization of the so-called ALT heuristic. The latter is typically much weaker than the former.

Using the separator heuristic based on S means storing the positive value c(v,S) for each $v \in G$. In practice, a number of independent separators $S_i$, i=1, . . . , k may be employed, computing and storing in a preprocessing stage all the k cost values $c(v,S_i)$ for each vertex $v \in G$. Each results in a different heuristic value $h_i(s,t)$. Since all the heuristics are admissible, the final heuristic value, taken as the maximum of the individual heuristic values, is also admissible:

$$h(s, t) = \max_{i=1,\ldots,k} h_i(s, t) \quad (2)$$

To be effective, the set of separators should cover the map well. This is typically just a set of equally-spaced horizontal and vertical separators. As such, it is a global set of separators, earning the heuristic the name Global Separator Heuristic (GSH). While the heuristic is effective, it depends critically on the separation property. If s and t are separated by some S, h(s,t) will typically be a good estimate of c(s,t), albeit this also depends on the "angle" of the separator relative to s and t. If s and t are not separated by any of the k separators, h(s,t) will usually be far from c(s,t). This implies that if the map is very large, a significant number of separators will be required to ensure that most pairs of query points (s,t) are separated by at least one separator, especially if s is close to t (relative to the size of the map), as is typical in navigation applications. Unfortunately, using a large number k of separators could be unpractical, as it would require the storage of a large number of values per graph vertex, which could be prohibitive. Thus it would seem that GSH is not scalable to very large road maps.

Local Separator Heuristic (LSH)

Also proposed herein is a more sophisticated use of a hierarchical set of separators, called the Local Separator Heuristic (LSH). The goal of this hierarchical set of separators is to achieve or guarantee that any pair of query vertices (s,t), even those close to each other, will be separated with high probability. This heuristic relies on a recursive binary subdivision of the map.

Figure 1B:
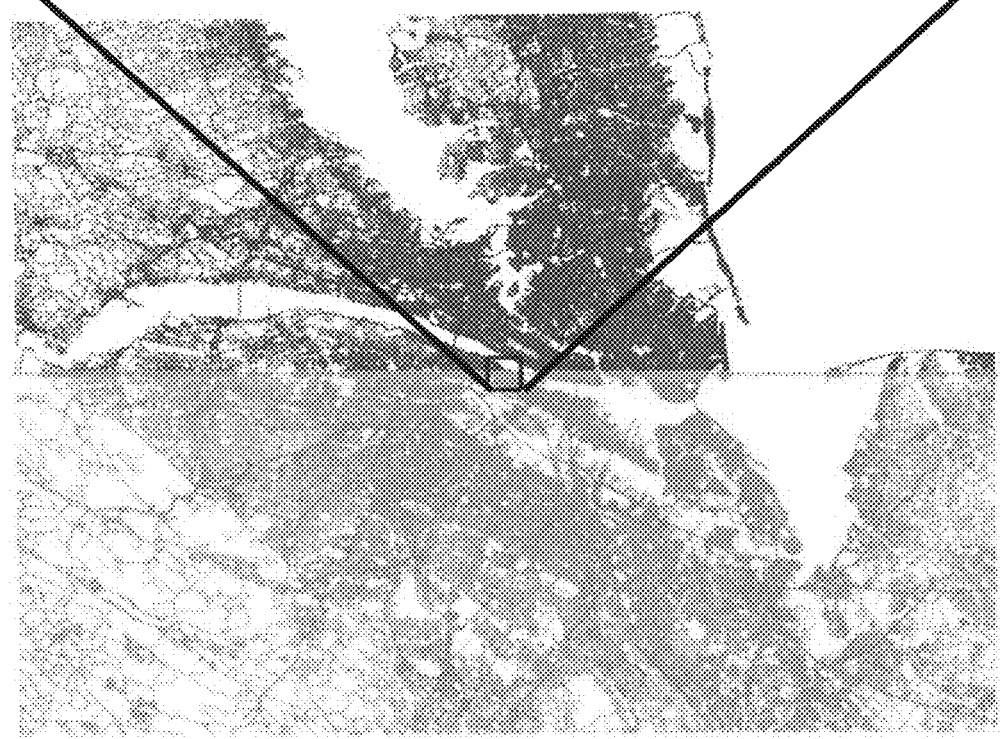
Figure 1C:
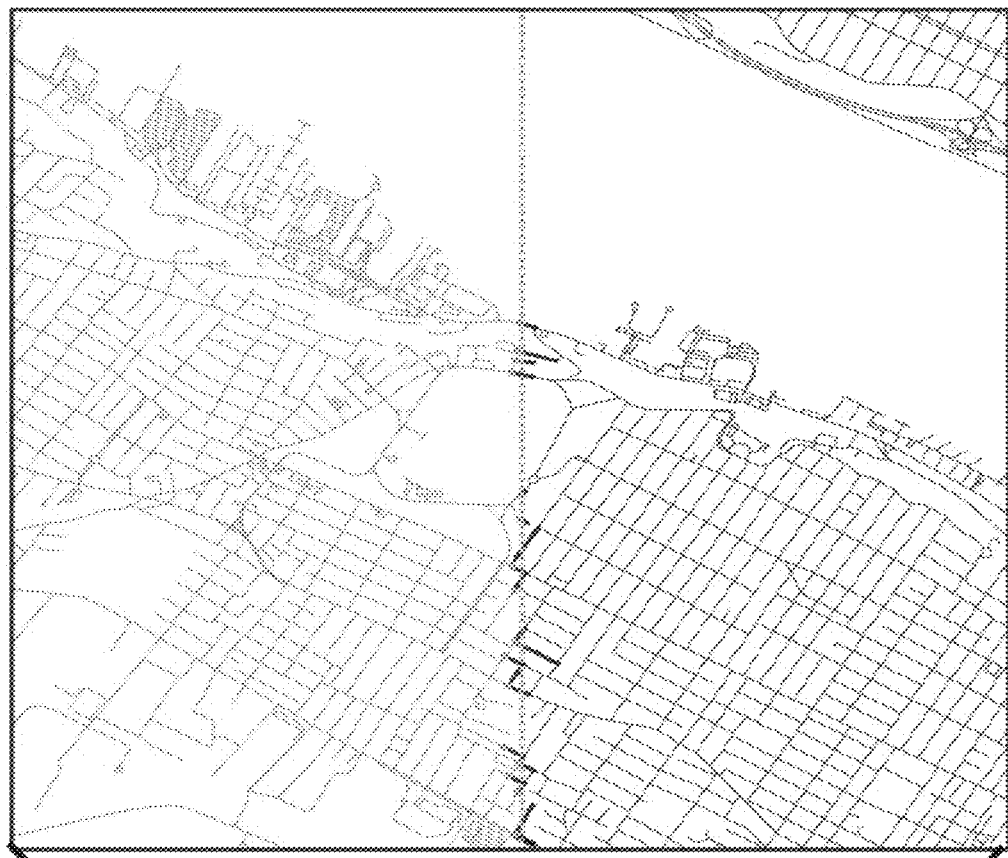
Figure 1D:
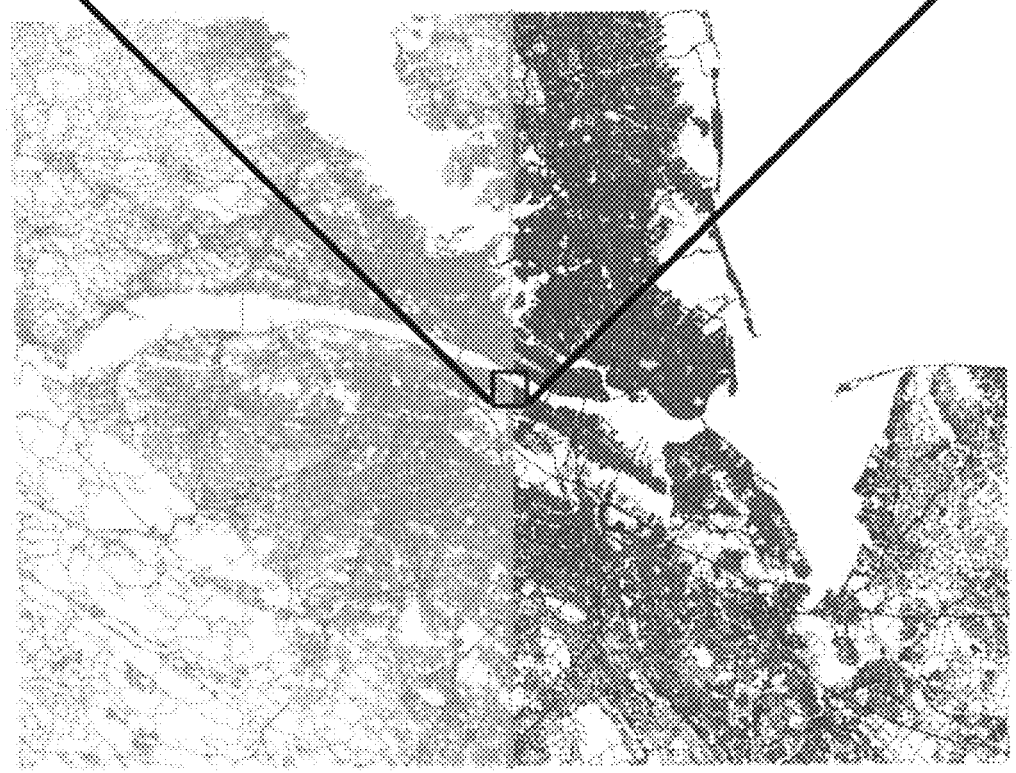

If the graph G=<V,E,c> is embedded in the plane, namely, each vertex is assigned (x,y) coordinates, and every edge (u,w) drawn as a straight line segment between the position of u and the position of w, it is possible to generate a separator of the graph by drawing a line (or polyline) L on the plane through the graph. Line L will intersect a subset of the edges F ⊂ E. It is straightforward to verify that the set S defined as the vertices obtained by taking either one of the two vertex endpoints of all edges in a non-empty F is a separator of G. FIGS. 1A-1B illustrates such examples.

If G is a graph representing a road network, and B its bounding box in the plane, then two independent separators may be generated, as described above. The first, $S^v$, using a vertical line through the center of the box and the second, $S^h$, using a similar horizontal line. Using the above eq. (1), each of the two separators defines a heuristic, and the final heuristic is obtained, using above eq. (2), as the larger of the two values.

Because in this embodiment, for example, the two separators are perpendicular to each other, they are complementary in covering the space of angles on the map. So if the heuristic based on the vertical separator does not do a good job in approximating c, there is a good chance that the heuristic based on the horizontal separator will compensate for that. See the examples in FIGS. 2A-2D, and especially FIG. 2A. The use of these two separators require the storage of the two values $c_1^v(u)=c(u,S^v)$ and $c_1^h(u)=c(u,S^h)$ for each u∈V.

If at least one of the two separators $S_1$ or $S_2$ does separate the query vertices s and t, then the heuristic computation is completed here. However, with just these two separators, the chances of separating an arbitrary pair of vertices which are close to each other are very small. Thus recursive separation of the subgraphs generated by the separators and storing the relevant minimal costs of each vertex in each subgraph to the relevant separator is needed. After k levels of recursive subdivision, each vertex will have a vector of k costs. A cost entry of s is common to a cost entry of t if derived from the same separator. With this recursive method, all but pairs of vertices which are extremely close to each other will have at least one separator in common.

Figure 2:
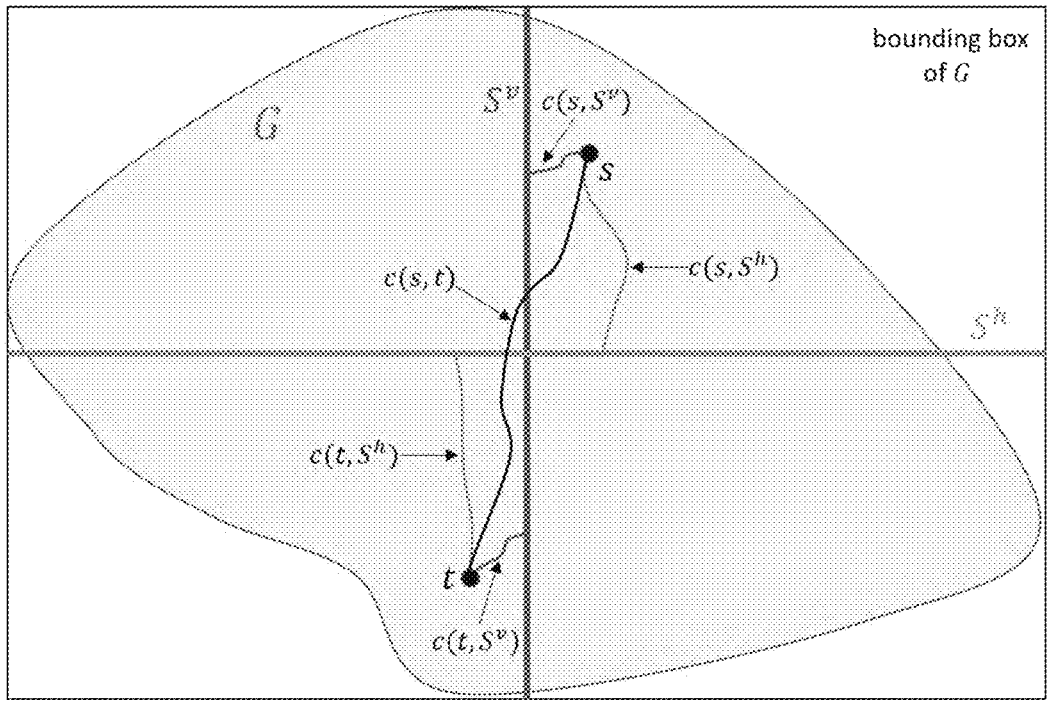
FIGS. 2A-2D are illustrations of a Local Separator Heuristic (LSH) where

For the LSH example in FIGS. 2A-2D, illustrated in FIG. 2A is a top level of the local separator heuristic. The plane embedded graph is separated by a (red) vertical and (green) horizontal line through the middle of the vertical and horizontal extent of the graph. Both these separate s from t. The (black) minimal-cost path between s and t has cost c(s,t). The heuristic using $S^v$: $c(s,S^v)+c(t,S^v)$ is much worse than the heuristic using $S^h$: $c(s,S^h)+c(t,S^h)$, which is closer to the true minimal cost c(s,t). Taking h(s,t)=max ($c(s,S^v)+c(t,S^v)$, $c(s,S^h)+c(t,S^h)$) gives the best of both worlds.

Figure 2B:
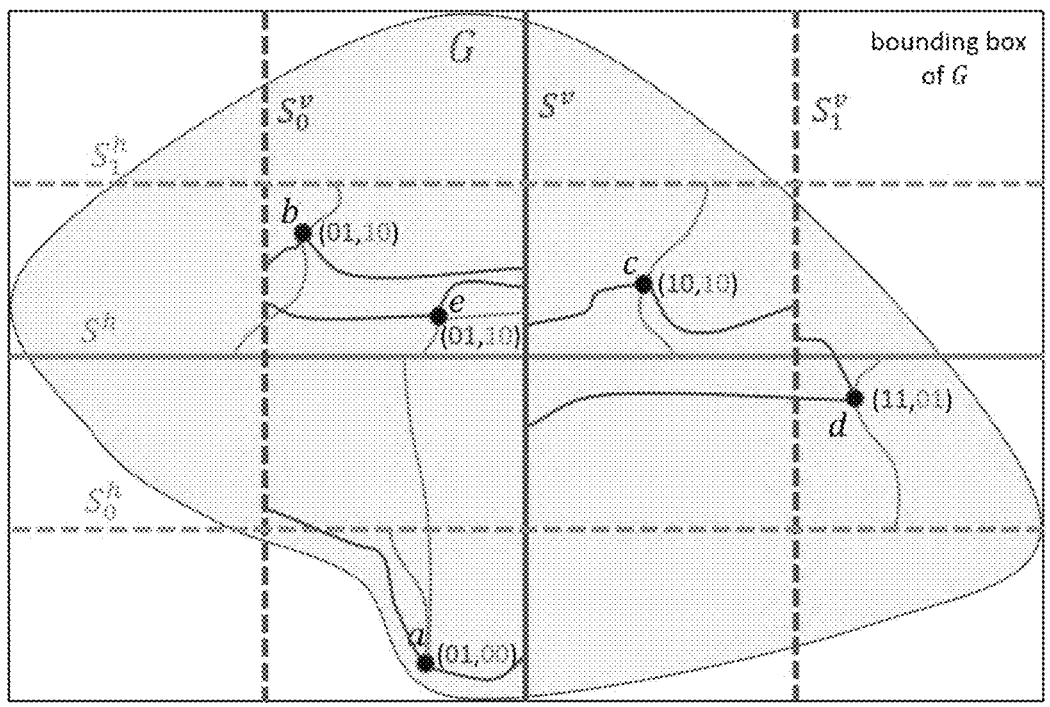

FIG. 2B illustrates LSH using two levels of subdivision. Two new vertical and two new horizontal separators are added to the system, subdividing the two vertical extents and two horizontal extents defined by the top level separator. The binary subscript of the separator indicates in which extent it lies. Any vertex of G can be labeled with a (red) two-bit binary code for the horizontal dimension and a (green) two-bit binary code for the vertical dimension. Derived from the coordinates of the vertex, each code indicates in which of the two halves of each dimension the vertex lies. Each vertex has two "costs" in each dimension, measuring the minimal cost from the vertex to the relevant separators. Note that the minimal-cost paths are not necessarily confined to any specific portion of the graph. Since a and c are separated immediately at the top level in both dimensions, then they have these two costs in common, and the heuristic value is determined by only these separators h(a,c)=max($h_{Sv}(a,c),h_{Sh}(a,c)$). In contrast, a and d are separated by the top level vertical separator, but only by the second level horizontal separator, so have one vertical and two horizontal costs in common. Thus h(a,d)=max ($h_{Sv}(a,d),h_{Sh}(a,d),h_{S0h}(a,d)$). Vertices b and e are not separated at all, so have two vertical and two horizontal costs in common (which are combined to form a heuristic using the ALT formula), resulting in: h(b,e)=max ($h_{Sv}(b,e),h_{S0v}(b,e),h_{Sh}(b,e),h_{S1h}(b,e)$). The number of costs in common in a given direction is the number of prefix bits they have in common in the respective binary code+1, capped to the length of the binary code.

Figure 2C:
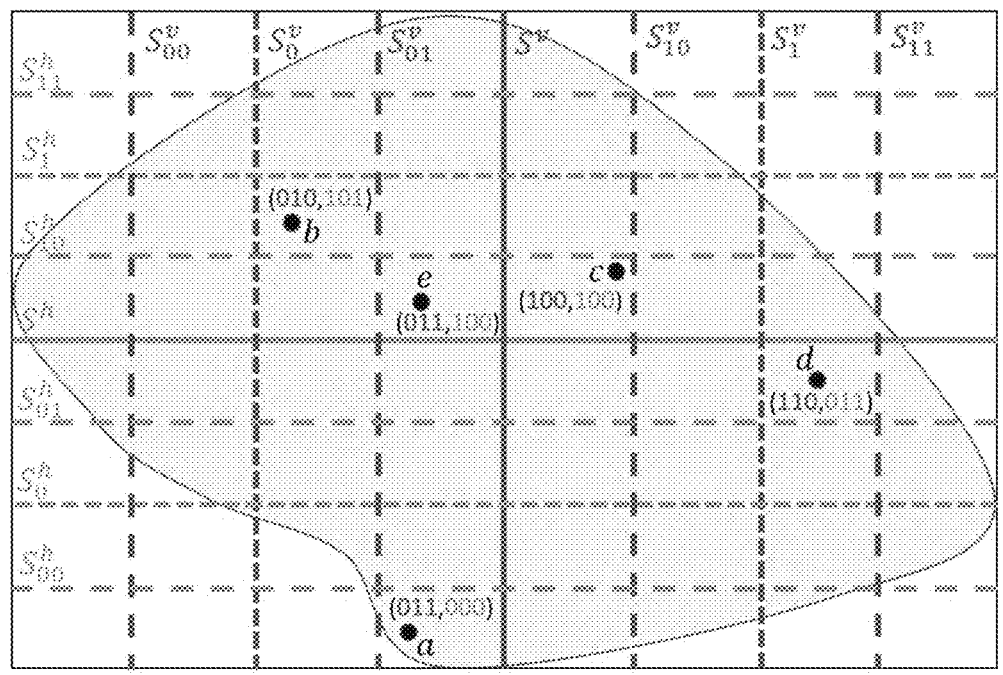
Figure 2D:
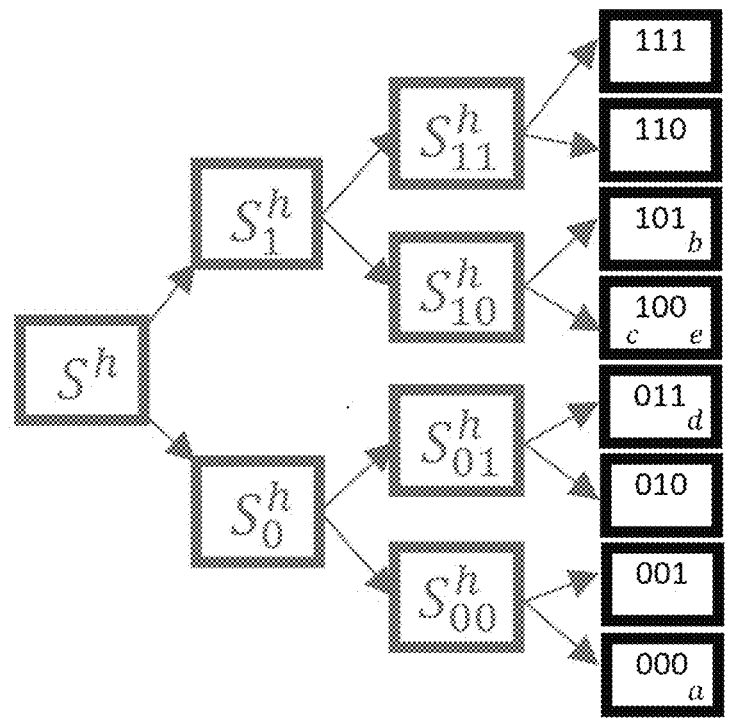
Figure 5A:
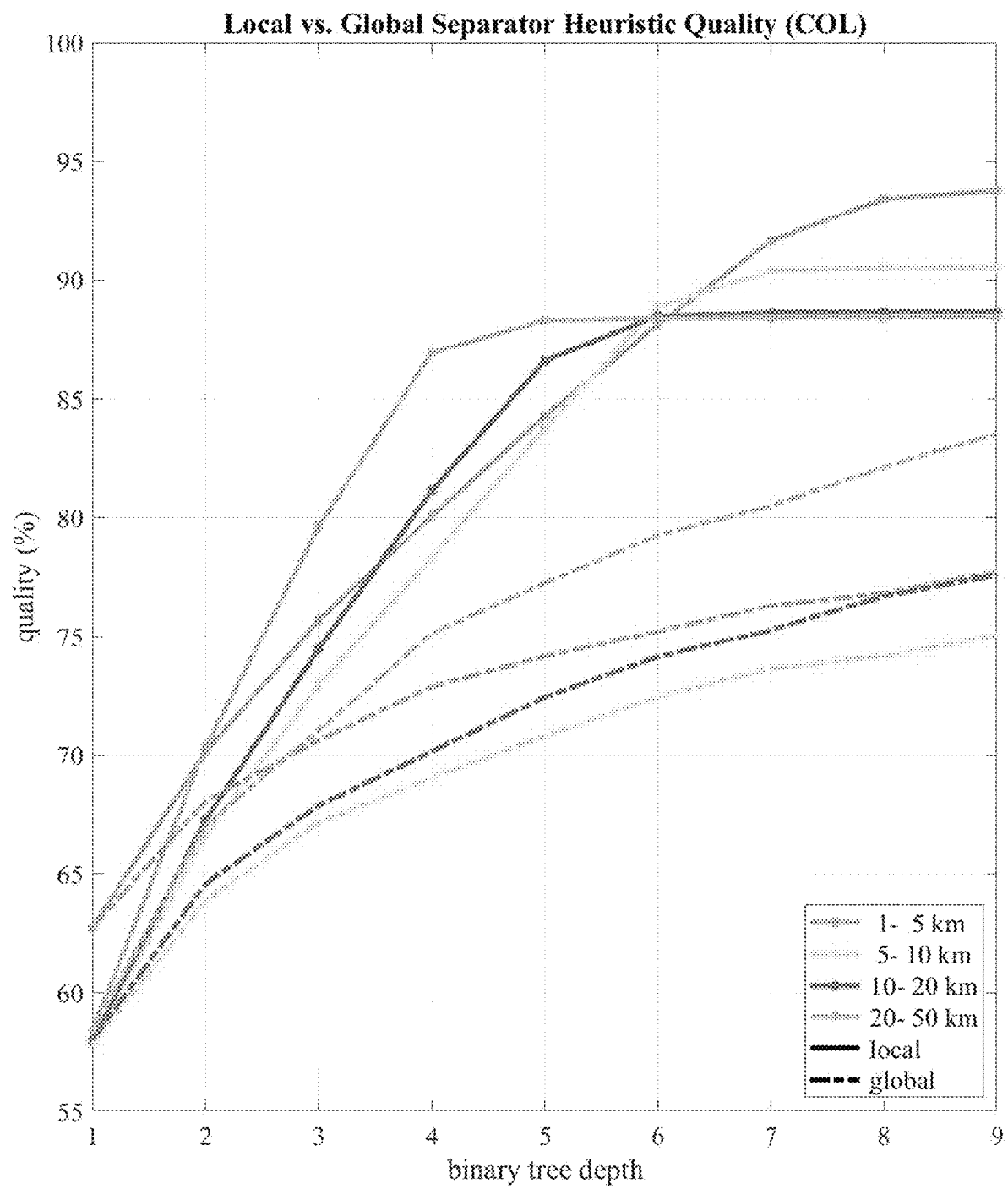
FIGS. 5A-5D are graphs illustrating heuristic qualities and efficiencies on a road map of Colorado (COL) for (s, t) pairs of different distances, as a function of separator tree depth, where for the local separator heuristic (LSH), marked by solid curves, quality monotonically increases with tree depth, and for the global separator heuristic (GSH), marked by dashed curves, quality tends to increase with the number of separators, but at a much lower pace, and large distances require shallower trees than short distances, which benefit much more from tree depth.
Figure 5B:
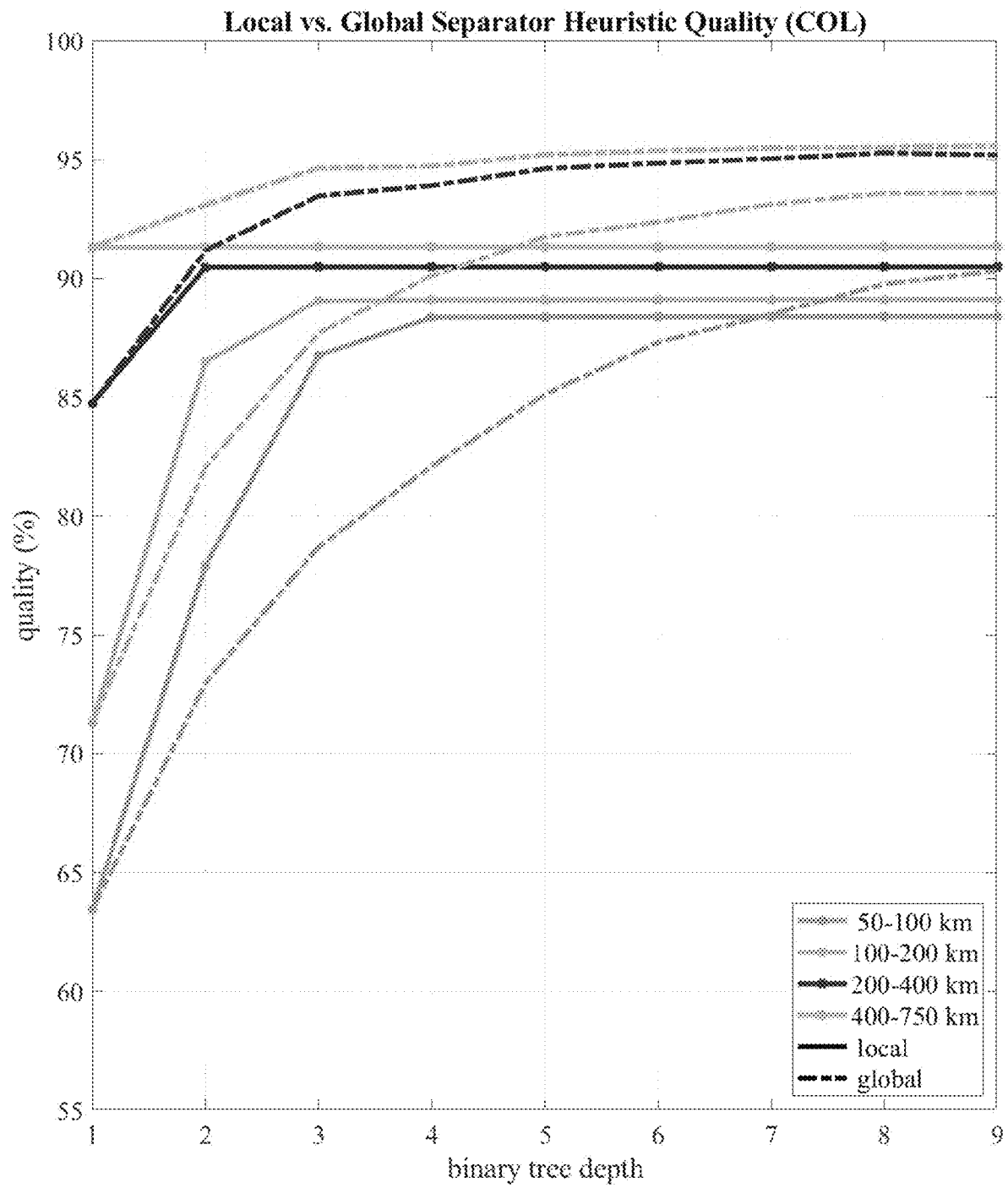
Figure 5C:
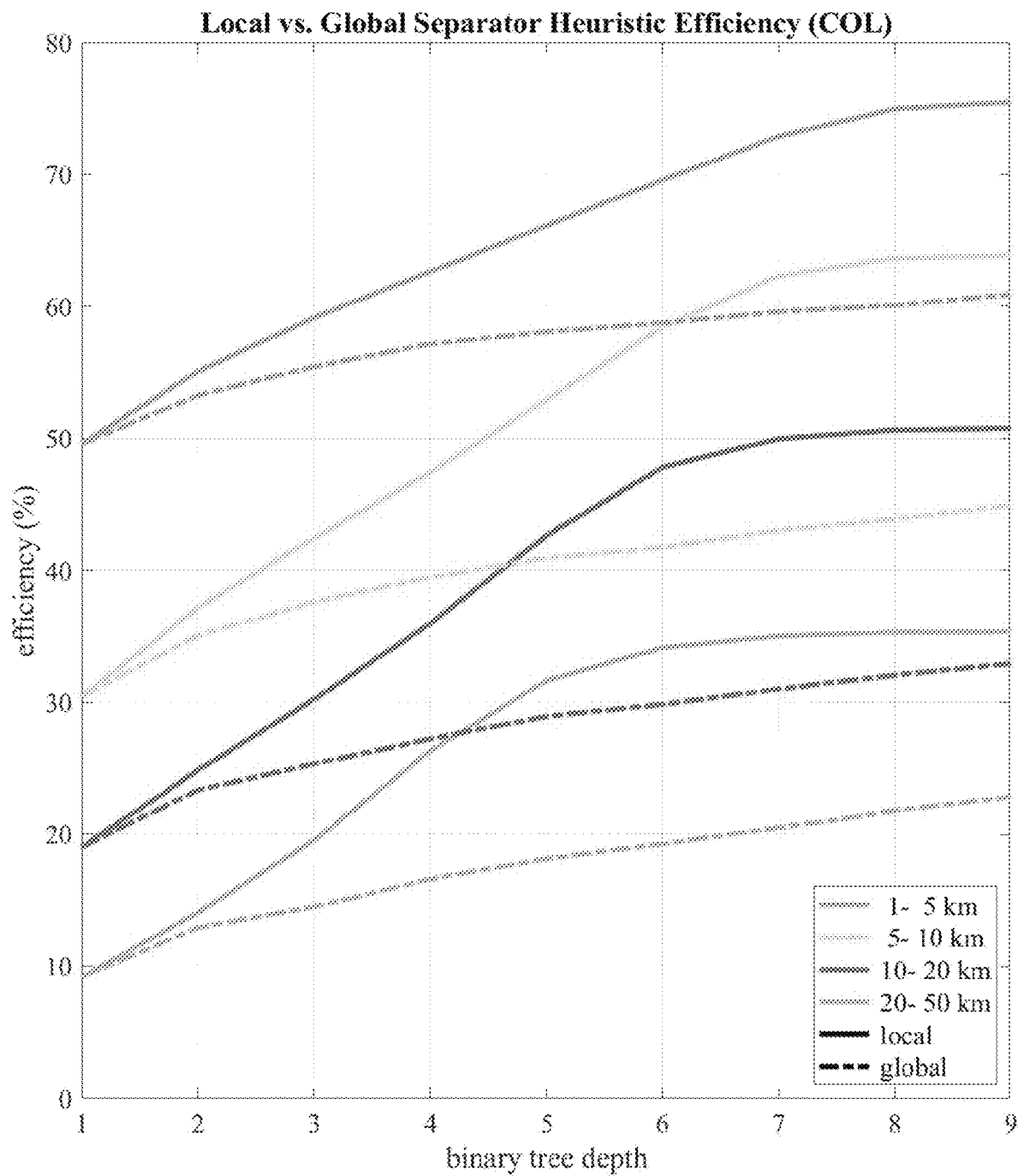
Figure 5D:
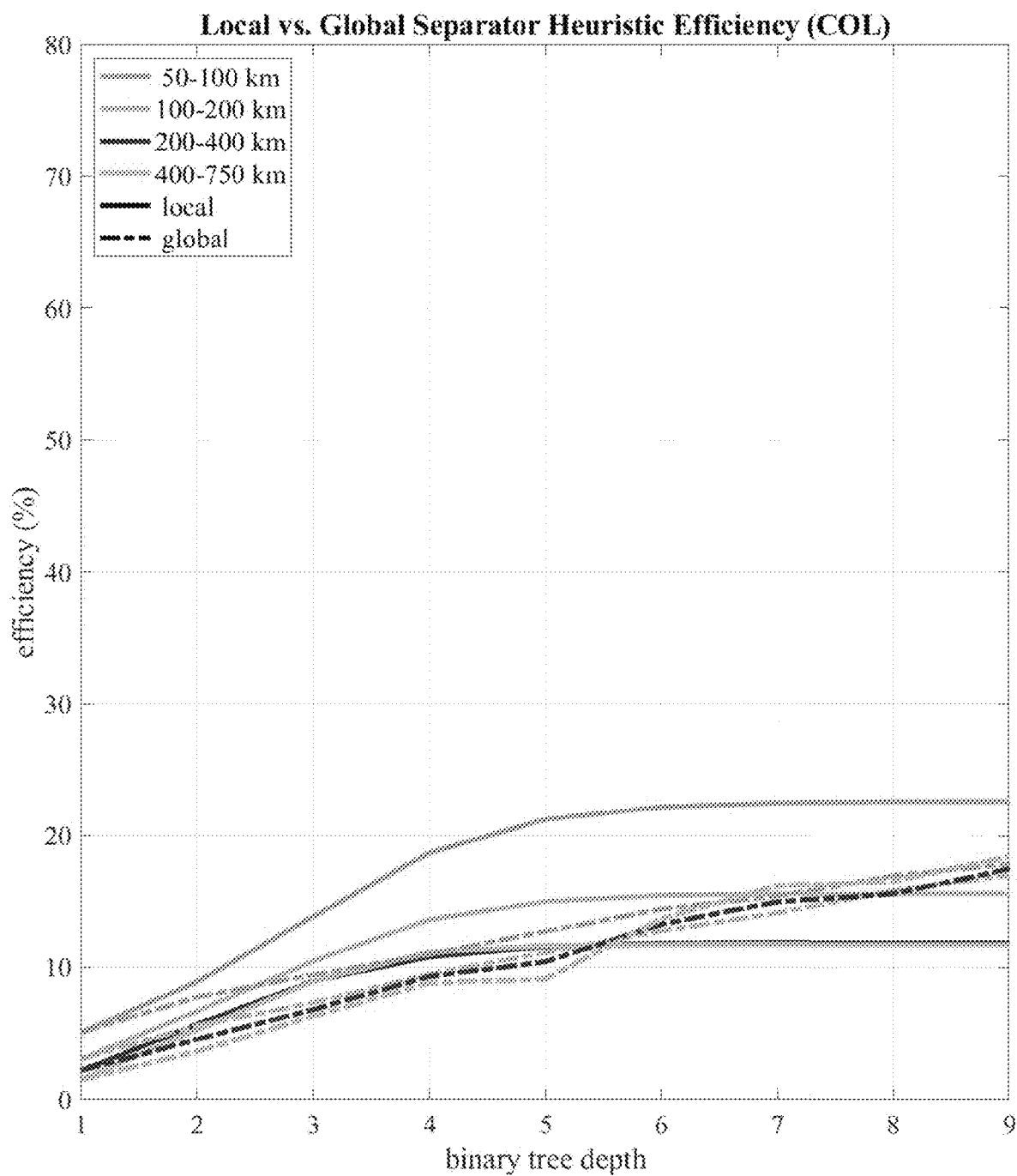
Figure 6A:
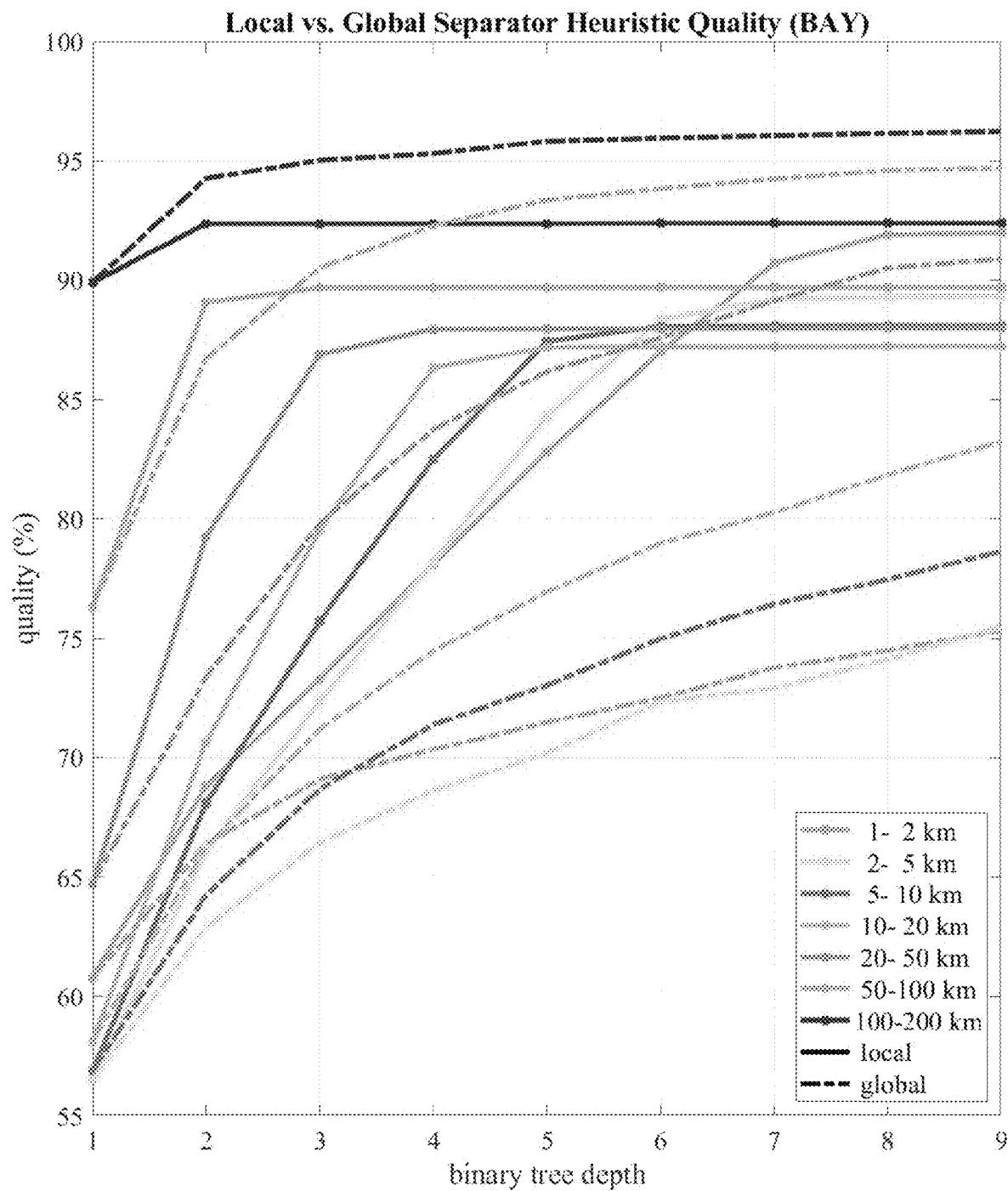
FIGS. 6A-6D are graphs illustrating heuristic qualities and efficiencies on the road maps of the San Francisco Bay Area (BAY) and New York Metro (NY) for (s,t) pairs of different distances, as a function of the separator tree depth.
Figure 6B:
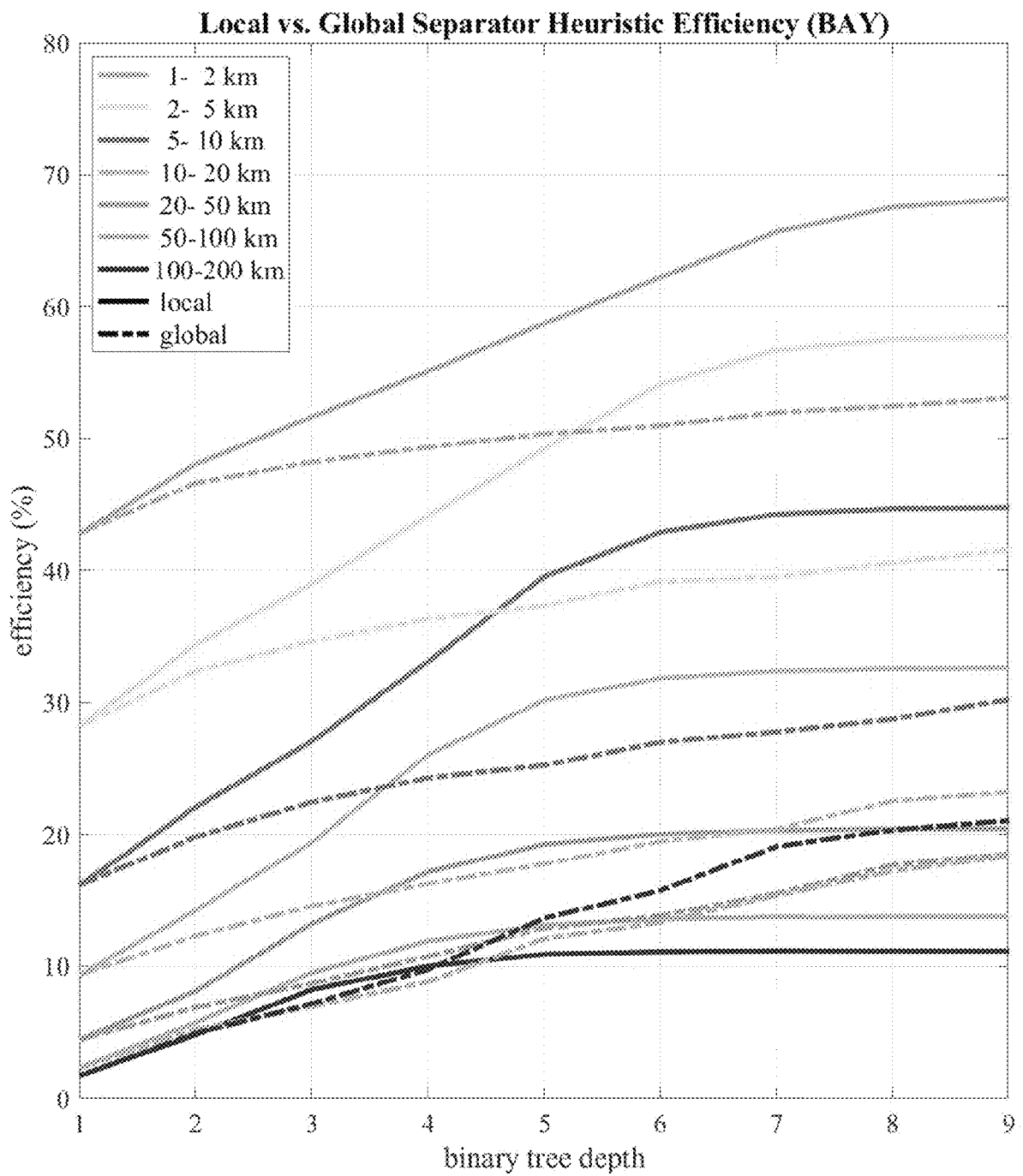
Figure 6C:
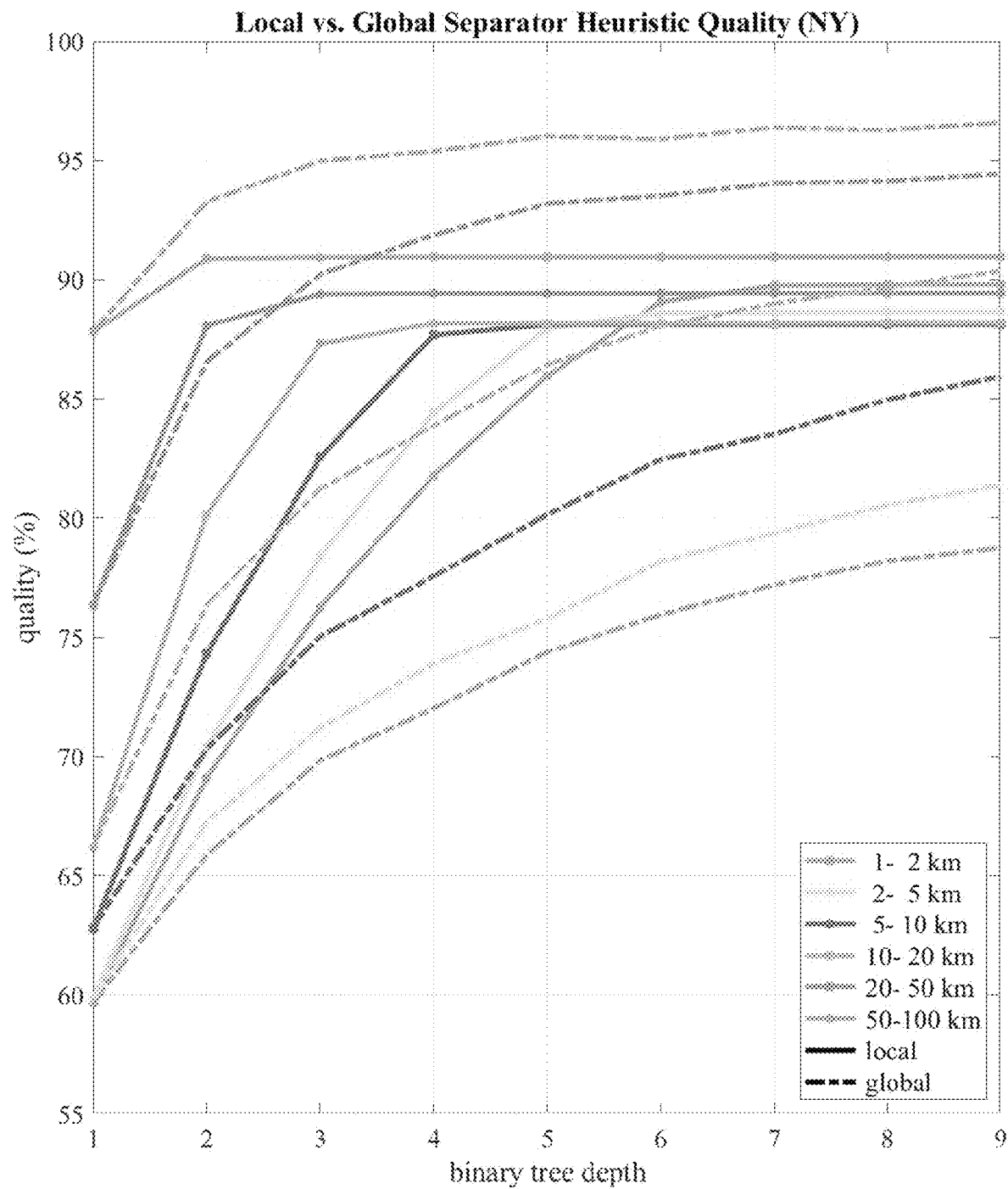
Figure 6D:
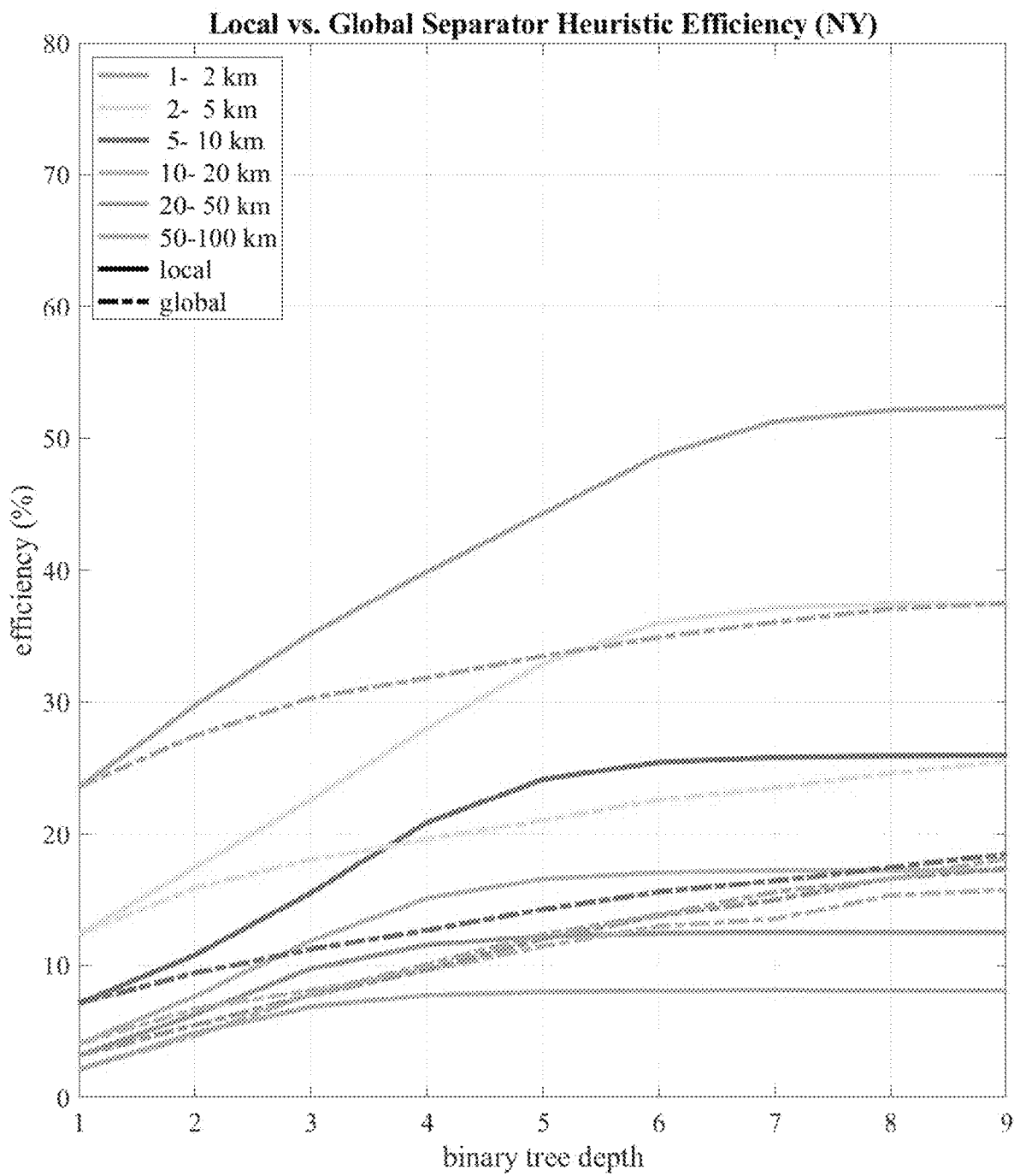

FIG. 2C illustrates LSH using three levels of subdivision. Each vertex has two three-bit codes. Now h(a,c) is identical to the one-level case, and h(a,d) to the two-level case, but b and e are now separated also by the vertical $S_{01}^v$ and the horizontal $S_{10}^h$, so h(b,e)=max ($h_{Sv}(b,e),h_{S0v}(b,e),h_{S01v}(b,e),h_{Sh}(b,e),h_{S1h}(b,e),h_{S10h}(b,e)$). FIG. 2D illustrates the binary tree corresponding to the three-level horizontal separator system.

Determining LSH

Assuming 2k costs per vertex, the LSH heuristic is computed in two parts as follows. First, in an offline pre-processing stage, two abstract binary trees of depth k are constructed recursively while generating vertical and horizontal separators. During each recursive process, a k-bit binary code and a positive real k-vector of costs are assigned to each vertex. One set of codes and costs is computed using the x coordinates of the vertices, and another using the y coordinates. The x coordinates (and similarly the y coordinates) are used by running the pseudo-code shown as in an example in FIG. 3.

Second, in the online query stage, computing the LSH h(s,t) involves comparing the binary codes of s and t from left to right. If the corresponding bits are equal, this indicates a common separator with a common cost that can be used through the ALT triangle inequality. If the corresponding bits are different, this indicates a separator and the separator heuristic may be applied. The procedure terminates when either the codes are exhausted, thus identical, namely no separation is achieved, or when the first non-equal bit is discovered, indicating separation at that level. See for an example the pseudo-code in FIG. 4. The complexity of computing h(s,t) is thus O(k). The chances of separating s and t increases exponentially with the tree depth k, so this will happen even when they are quite close to each other, given a reasonable depth. Essentially high probability of separation is achieved for k=0(log n), where n is the number of vertices in the graph.

Comparing GSH and LSH

Both the basic Global Separator Heuristic (GSH) and the Local Separator Heuristic (LSH) described in the present disclosure were compared as to how informed the methods are when approximating the fastest travel time on a number of road networks whose edges are weighted with realistic travel times. Used were the datasets of directed graphs or pre-existing road maps on portions of New York, Colorado and the San Francisco Bay Area. Table 1 below shows the sizes of those graphs. Also used were undirected versions of these graphs, where the edges of the graphs were weighted by the minimal travel time along the two directed edges, which was computed as the Euclidean length of the edge (as computed from the latitude and longitude information per vertex) divided by the maximal speed on that edge, as extracted from OpenStreetMap. Distinguished was between pairs of points based on the (Euclidean) distance between them. Randomly selected were 3,000 pairs of points in "bins" of distances, e.g.: 1-5 km, 5-10 km, 10-20 km, 20-50 km, 50-100 km, 100-200 km, 200-400 km and 400-750 km.

For the state of Colorado, for example, which is approximately a rectangle of size 610×450 km, this covers all possible cases. The (s,t) pairs in each bin were chosen with uniform distribution over area, using the following method for the bin [a,b]: s was chosen at random uniformly within the bounding box of the graph, and then "snapped" to the closest map vertex, as long as the snap was not too far. The variable t was then chosen also at random within an annular region centered at s with inner radius a and outer radius b and snapped to the closest vertex as long as the snap was not too far and $\|s-t\| \in [a,b]$. Compared then was the true fastest-travel time c(s,t) with the heuristic h(s,t), when varying the number of levels of the binary tree, thus the number of costs used (and stored) per vertex, between 1 and 9 (in each of the two dimensions).

TABLE 1

| Roadmap | Colorado (COL) | Bay Area (BAY) | New York (NY) |
|---|---|---|---|
| Physical dimensions (km) | 623 × 450 | 178 × 225 | 85 × 112 |
| Vertices | 5,154,659 | 3,092,249 | 1,579,003 |
| Edges | 5,400,185 | 3,351,919 | 1,744,284 |

For each pair of vertices (s,t), the relative quality of the heuristic is measured:

$$qual(s, t) = \frac{h(s, t)}{c(s, t)}$$

which is a value in [0,1] reflecting how accurate the heuristic is. The closer this number is to 1, the more informed the heuristic is. The quality of the heuristic is the mean of this quantity over all possible pairs (s,t). The efficiency of a heuristic in conjunction with A* is measured as the number of vertices on the fastest path divided by the total number of vertices traversed by A*:

$$eff(s, t) = \frac{\#vertices(fastest\_path(s, t))}{\#vertices(A^*\_traversal(s, t))}$$

The closer this number is to 1, the more efficient the heuristic is. The efficiency of the heuristic is the mean of this quantity over all possible pairs (s,t). The best possible efficiency on a road network is typically 40%-50%, since any variant of A* must traverse at least the fastest path vertices and also their immediate neighbors. When an uninformed heuristic is used, the efficiency can sometimes drop dramatically to the vicinity of 1%, meaning 100 vertices of the graph are explored for every one vertex along the fastest path.

FIGS. 5A-5D and FIGS. 6A-6D show the qualities and efficiencies of LSH vs. GSH obtained in the experiments performed on the roadmaps of Colorado, New York and the Bay Area, one graph per distance bin, as a function of separator tree depth. The results for Colorado have been plotted in two separate graphs to avoid clutter. Each bin is colored separately, the dashed line for GSH and the solid line for LSH. Compared was the performance of a global set of separators using 2k separators (k in each dimension), thus 2k costs per vertex, with that of the local set of separators of depth k (one system in each dimension), thus also 2k costs per vertex. The global set of 2k separators was obtained by uniformly partitioning the map bounding box into k+1 vertical and horizontal strips. As seen in these FIGS. 5A-5D and FIGS. 6A-6D the quality curves must be monotonically increasing in the local case, but not necessarily in the global case.

For the Colorado map, LSH ultimately obtains a quality of 87%-94% for all distances, requiring more depth, as expected, for shorter distances. GSH obtains 73%-83% on the short distances (<50 km) and 90%-95% on long distances (50 km-750 km). The most significant difference is in the short distances where, for example, in the 1-5 km range, LSH achieves a quality of 94% at depth 9 compared to a quality of 77% for GSH. For the 5-10 km range, LSH achieves a quality of 90% at depth 7 compared to 72% for GSH.

The difference in efficiency is also most significant at shorter distances. For distances of 1-5 km, LSH achieves 75% compared to 60% for GSH and at distances of 5-10 km, LSH achieves 63% compared to 42% for GSH.

Similar results are obtained for the maps of BAY and NY. Since these span areas smaller than COL, the first bin covers a smaller range of distances: 1-2 km, for which a separator tree of depth 9 was needed. The last bin was 100-200 km for BAY and 50-100 km for NY. For 1-2 km, LSH provided on BAY a quality of 92% and efficiency of 68%, vs. 75% and 53% for GSH. Similarly, on NY, LSH provided a quality of 90% and efficiency of 52%, vs. 78% and 38% for GSH.

Figure 7A:
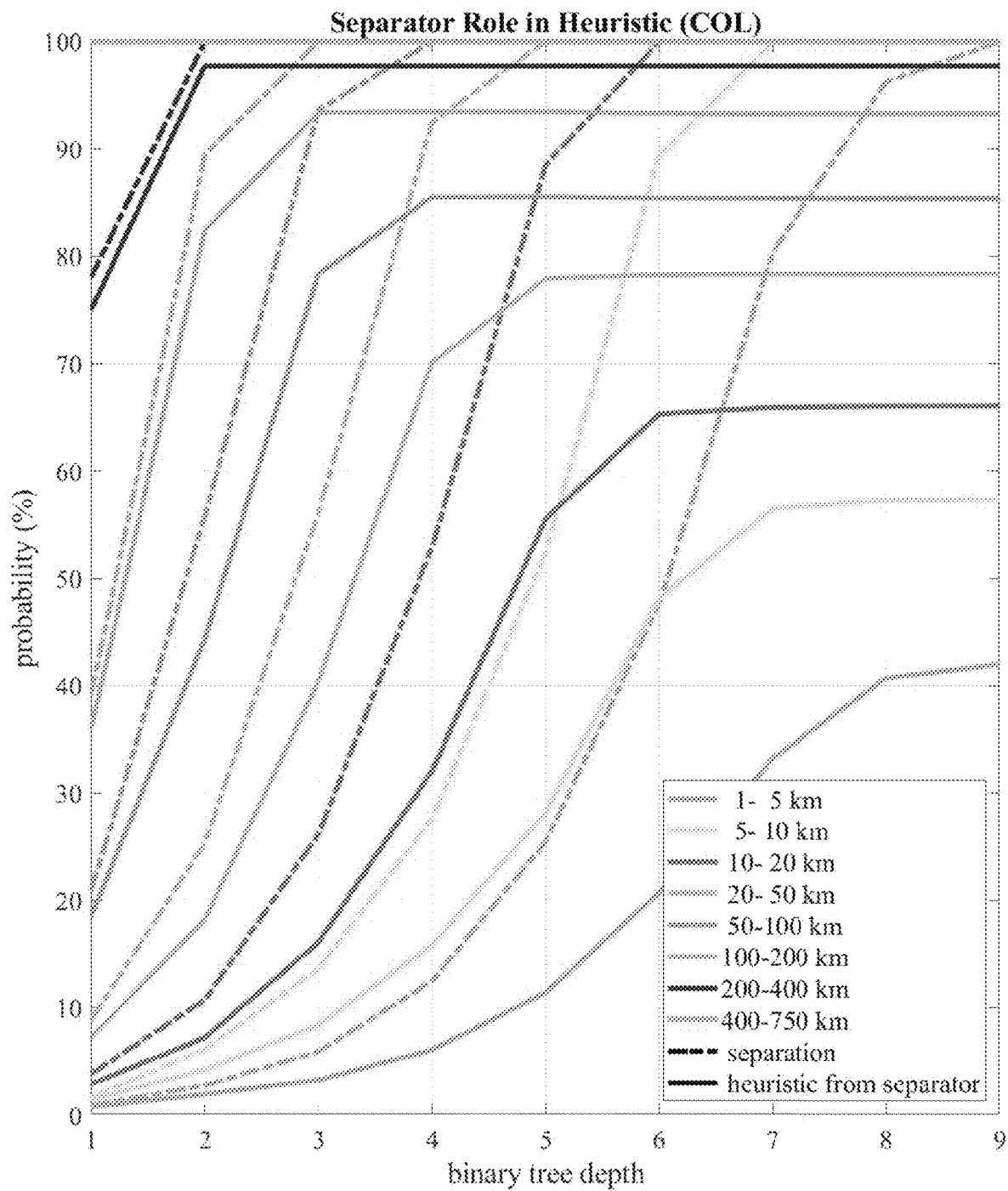
FIGS. 7A-7C are graphs illustrating the role played by a separator in determining the heuristic, where solid curves are the probability that a separator exists between s and t in the tree, and dashed curves are the probability that a separator exists and the final heuristic value is determined by that separator, as opposed to one of the other graph separators (that do not separate s and t, thus rely only on the triangle inequality)
Figure 7B:
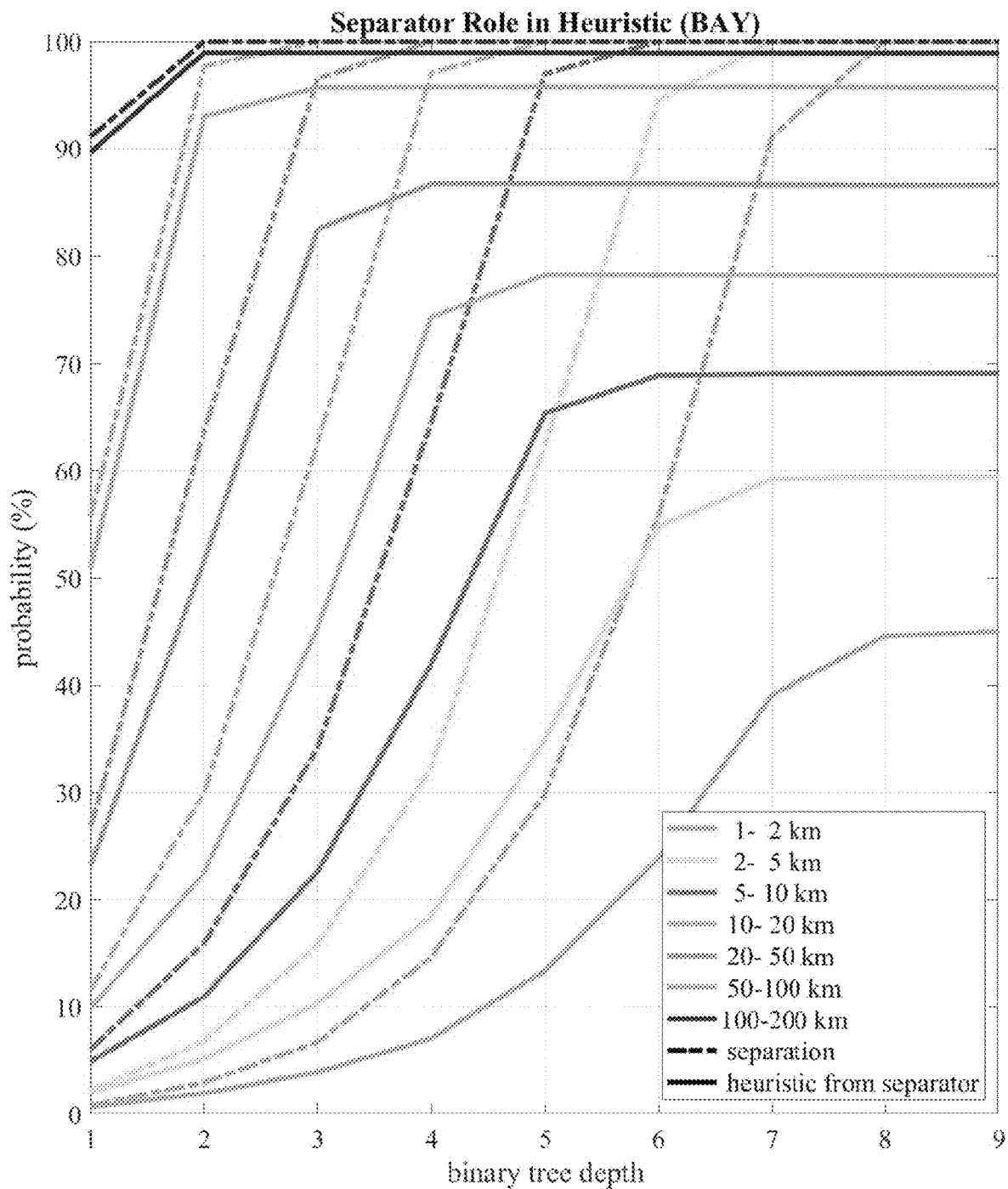
Figure 7C:
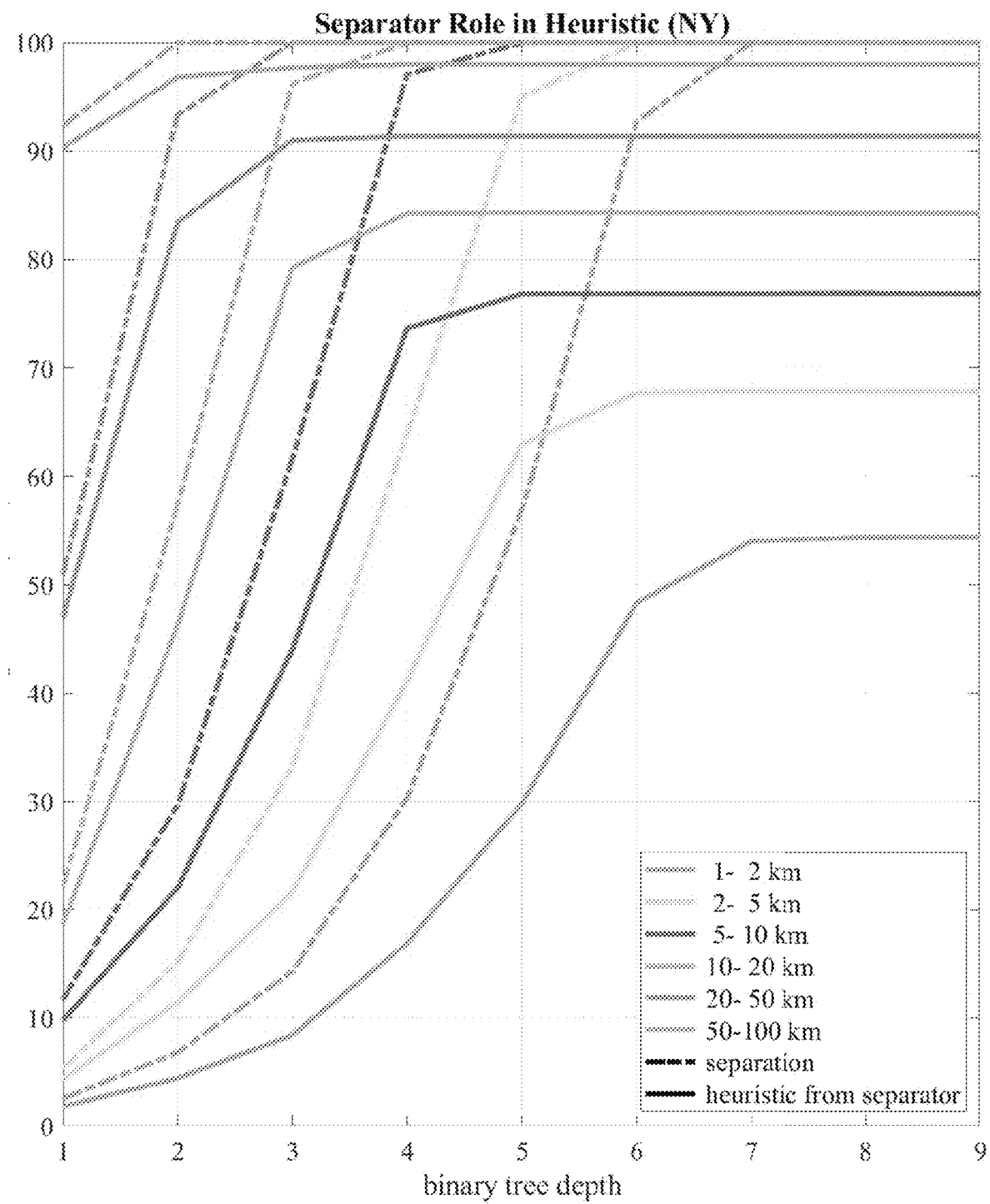
Figure 8A:
FIGS. 8A-8L are maps comparing heuristic efficiencies in three exemplary regions: Colorado (COL) in FIGS. 8A-8D, San Francisco Bay (BAY) in FIGS. 8E-8H, and New York (NY) in FIGS. 8I-8L, where the heuristic efficiencies of sample A* runs between black source vertex and magenta target vertex using the GSH and LSH heuristics and 6 or 14 costs/vertex (equivalent to two LSH trees of depth 3 or 7), colored vertices (and edges) are those traversed by A*: Blue—no heuristic, Red—GSH, Green—LSH, and blue path is resulting fastest path, heuristic efficiencies are in brackets, and significant differences in efficiency between the two heuristics at the higher depth of 7 is noted.
Figure 8B:
Figure 8C:
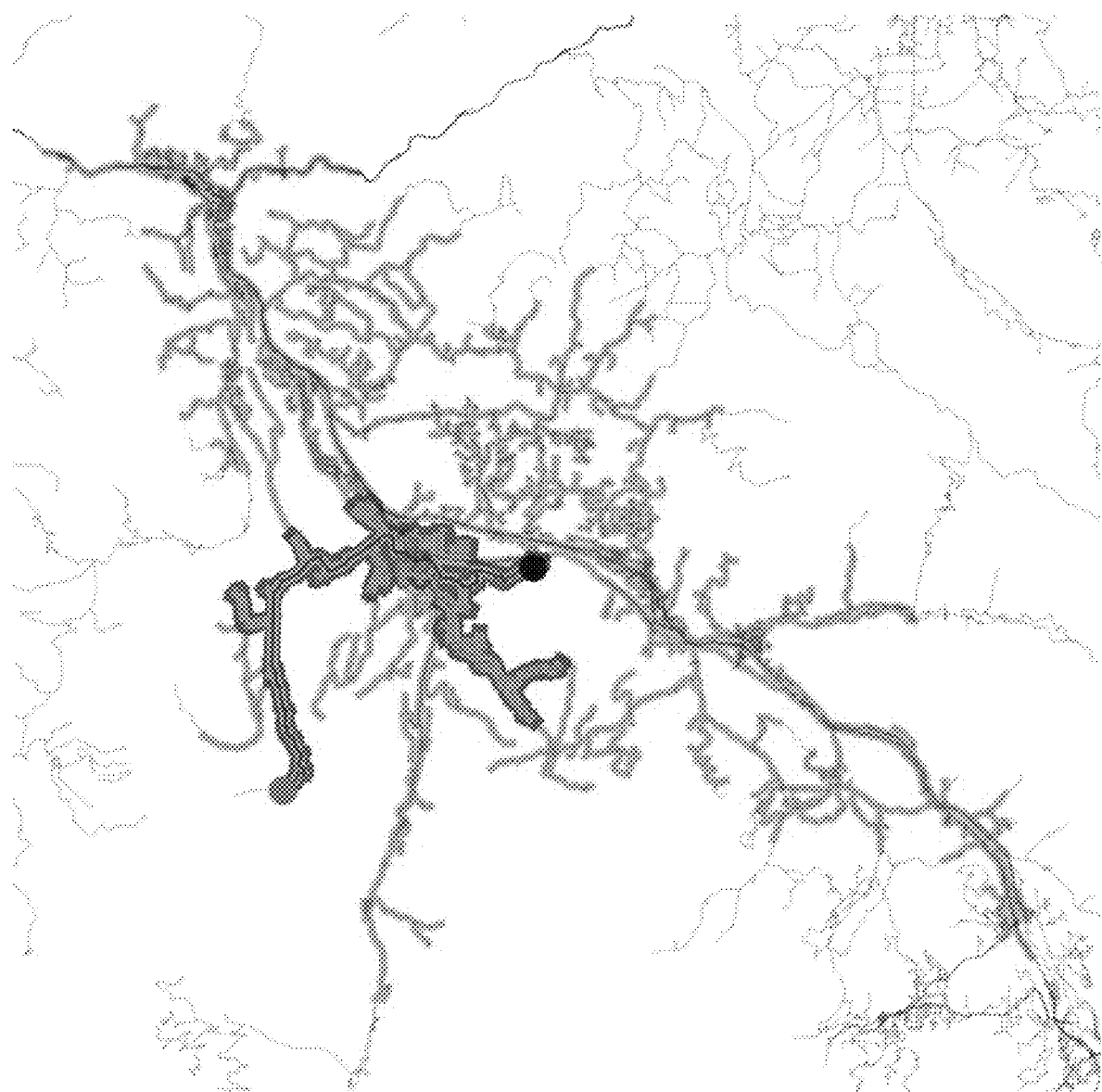
Figure 8D:
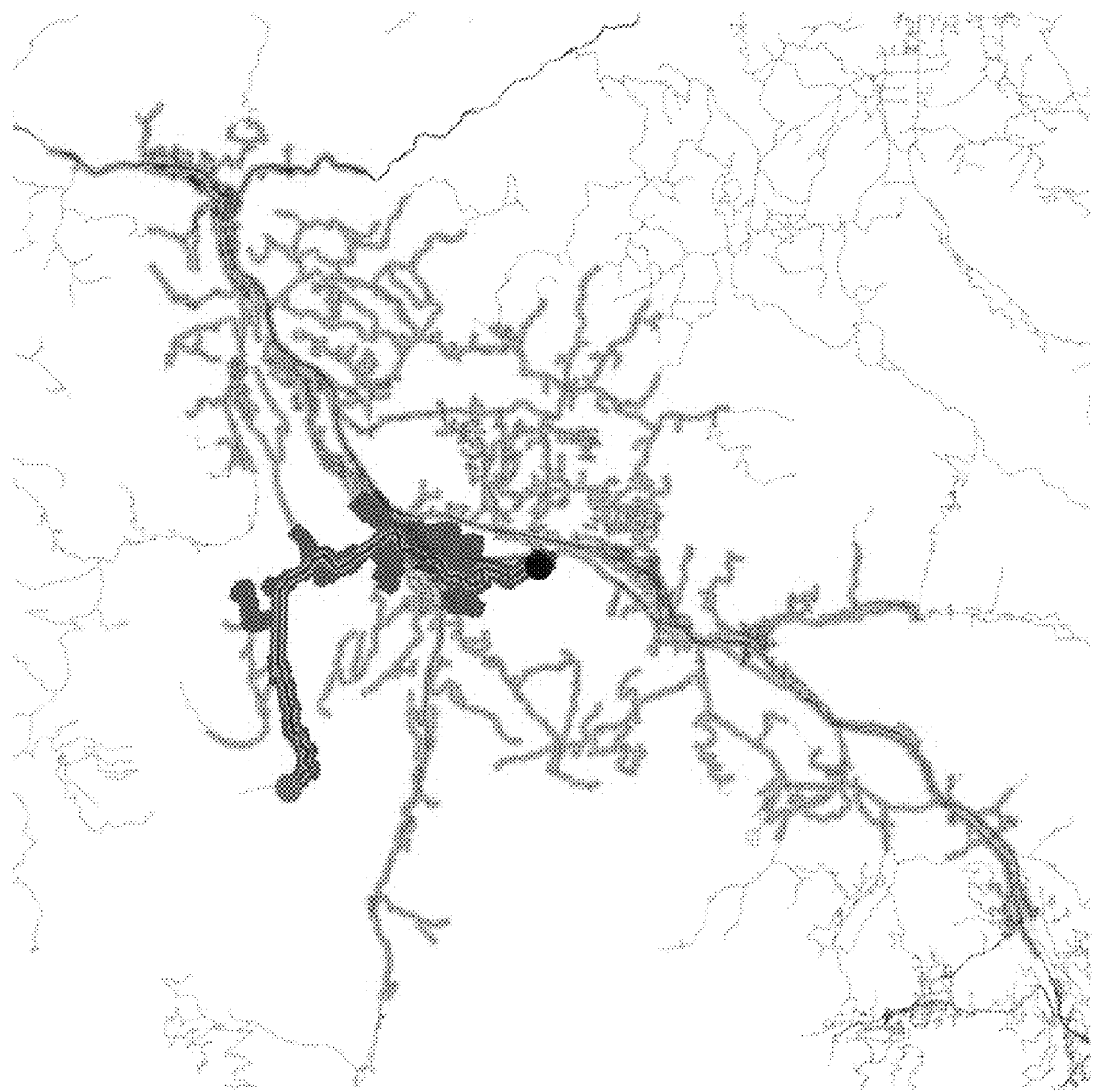
Figure 8:
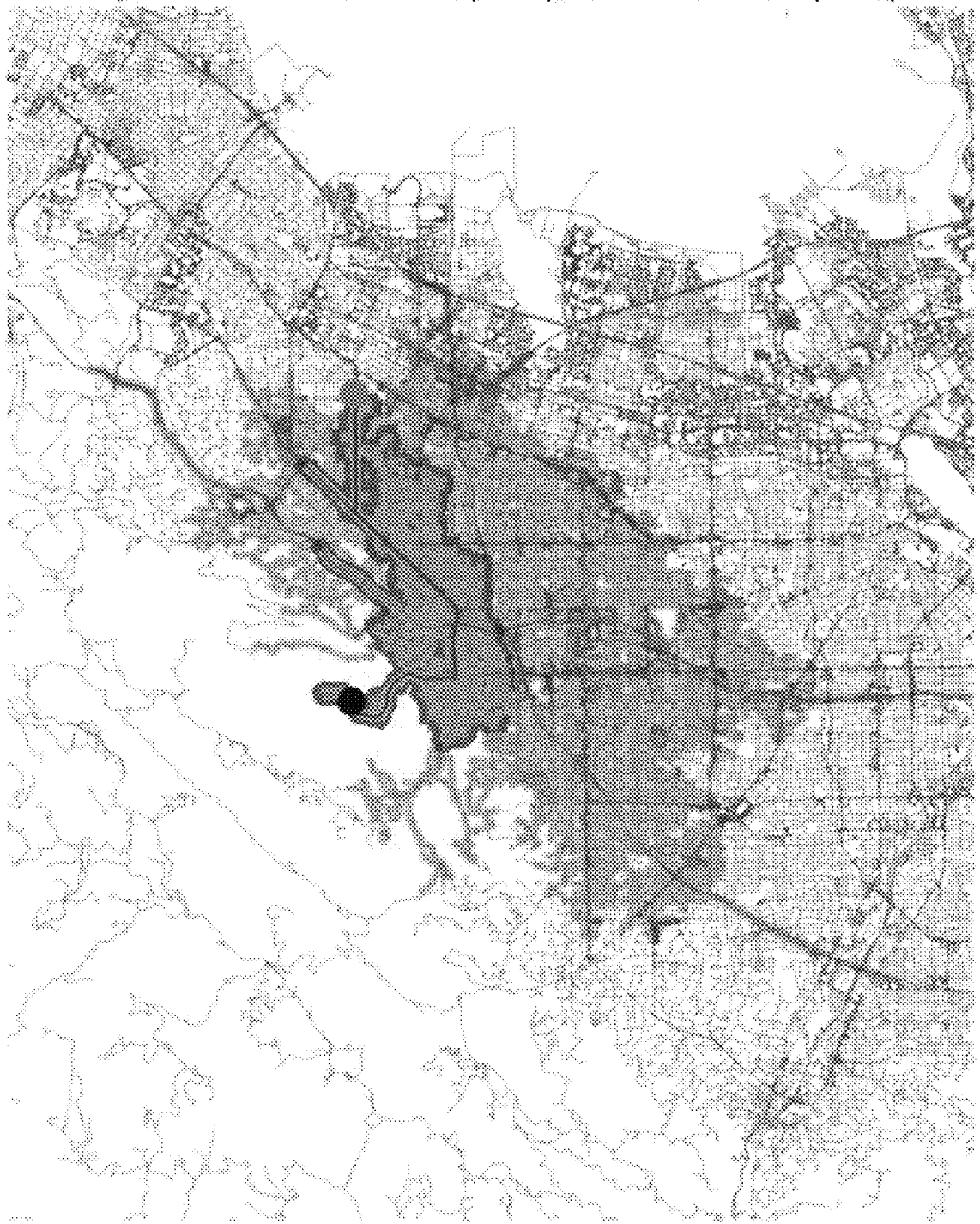
Figure 8F:
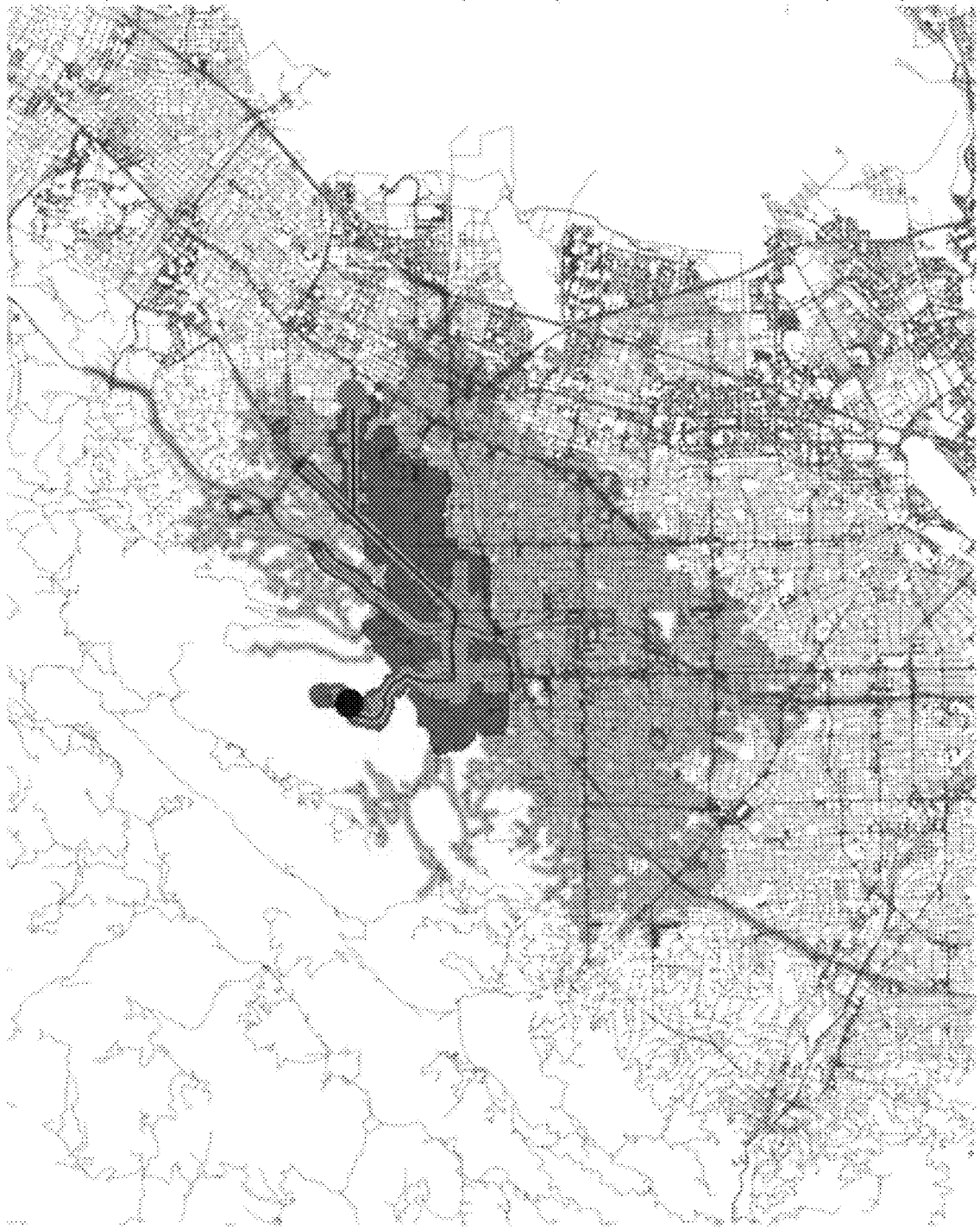
Figure 8G:
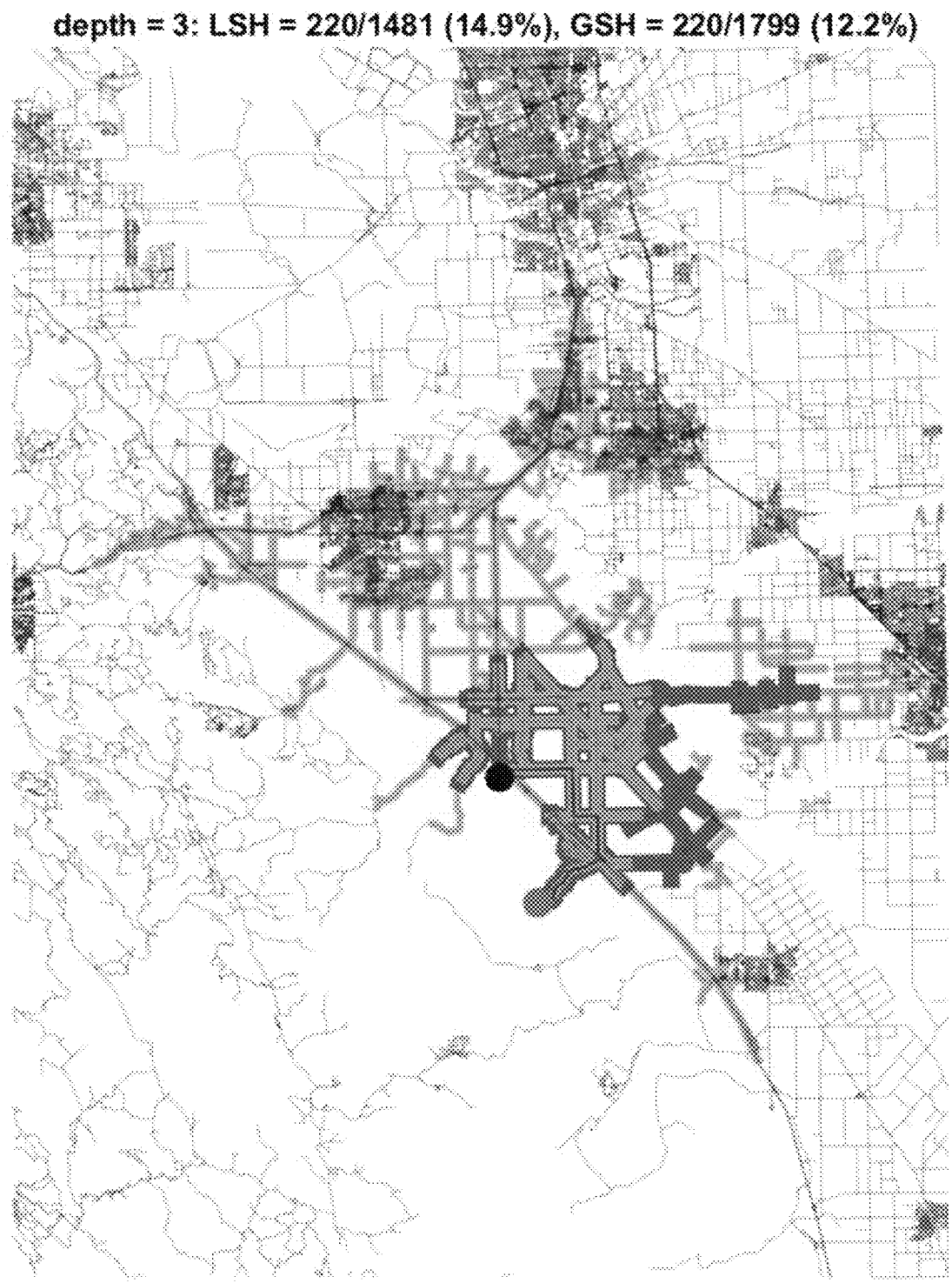
Figure 8H:
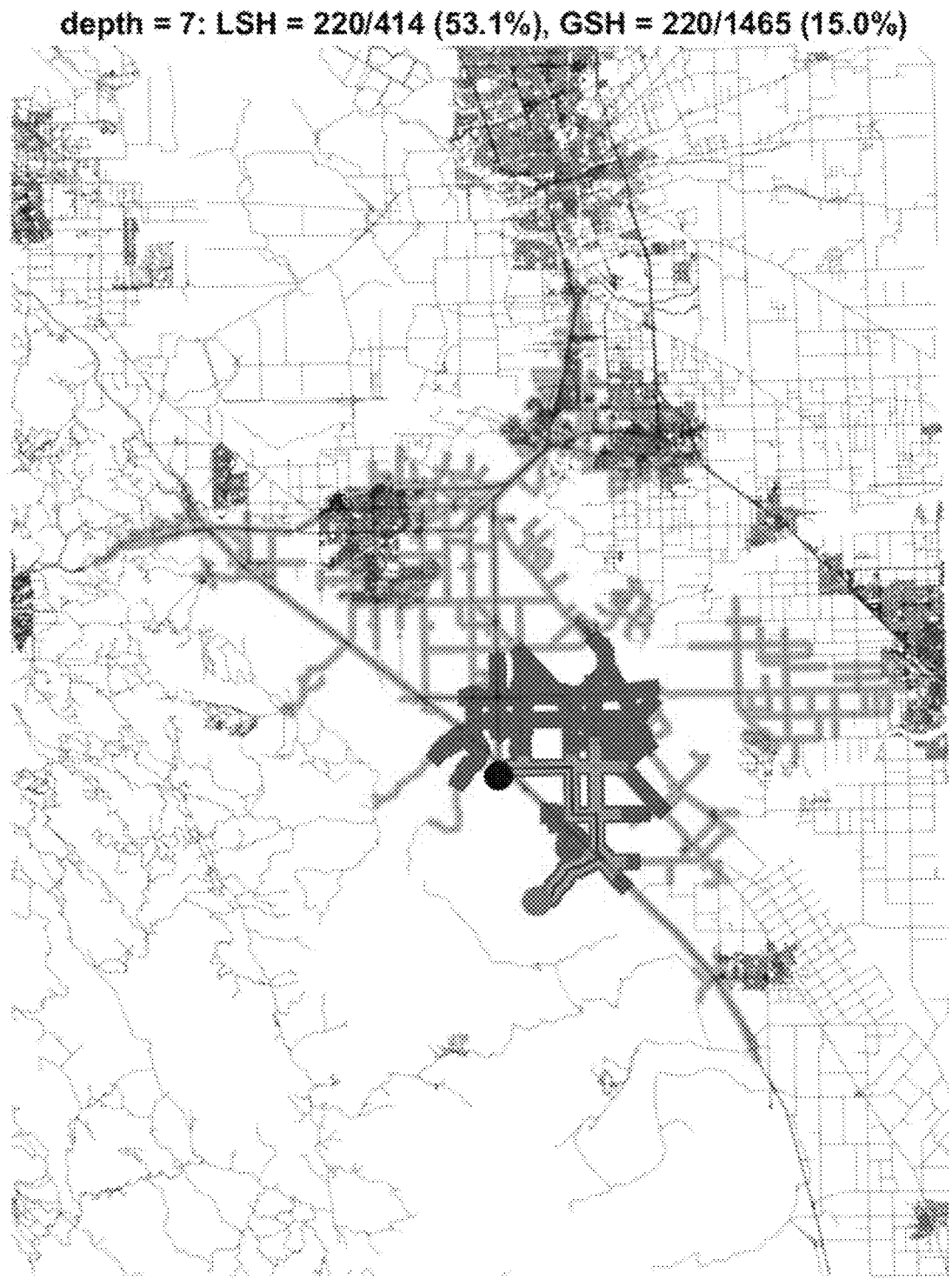
Figure 8I:
Figure 8J:
Figure 8K:
Figure 8L:

Reverting back at the heuristic computation code in FIG. 4, for which there are two different ways to compute the heuristic, depending on whether separation is achieved or not, it is interesting to determine whether separation is indeed achieved, and if so, whether the final value of the heuristic is actually determined by that separator. FIGS. 7A-7C provide answers to these questions about the role played by separation. For each map and distance range, plotted was (in the dashed line) the probability that a separator was found between s and t, and (in the solid line) the probability that that separator determined the final heuristic value (i.e. was larger than any other value considered). The results show that with enough depth, separation is always achieved, albeit at shallow depths for longer distances, as expected. A little surprisingly, the separator does not always determine the final heuristic value, going from 45%-55% on short distances, increasing to close to 100% on the longer distances.

To visualize better the effect of LSH vs. GSH, and appreciate how an increase in depth can dramatically increase the efficiency of LSH, FIGS. 8A-8L illustrate a number of fastest paths between vertices on the three different maps. The source vertex s is marked in black and the target t in magenta and the fastest path between them in blue. Red marks edges and vertices traversed by A* in computing the path using the GSH heuristic, and green marks the same when the LSH heuristic is used. The cyan edges in the background are those traversed by the simple classical algorithm, which is equivalent to A* using the completely uninformed heuristic h=0. FIGS. 8A-8L show the improvement in efficiency when a tree of depth 7 is used compared to a tree of depth 3 (or, equivalently, the number of separators used for GSH is increased from 2×3=6 to 2×7=14).

For example, on the COL map, going from 3 to 7 improves the efficiency from 9.7% to 33.6% for LSH, compared to a minor improvement from 9.4% to 9.7% for GSH. On the BAY map, an improvement from 14.9% to 53.1% for LSH, compared to the much smaller improvement from 12.2% to 15% for GSH. On NY, LSH improves from 12.2% to 46.6% vs. 9.0% to 12.3% for GSH. For some of these examples, even more dramatic improvements are possible for deeper separator trees (depths 8 and 9).

In summary, the present disclosure provides a separator-based admissible heuristic for A*, based on a binary tree of separators, which scales well to provide an informed estimate of the fastest travel time between two vertices in a road map, at short and long distances. The shorter distances are captured well by the deeper levels of the tree. This approach, that this disclosure appoints as the novel Local Separator Heuristic (LSH), scales well also in storage costs, i.e. the required number of costs stored per vertex is only (log n), where n is the number of vertices in the graph.

The LSH heuristic has been formulated herein and experimented with for undirected graphs, but is immediately applicable also to the more realistic case of directed graphs (especially when the graph models a road network). As shown by Chen and Gotsman [2], applying the method to directed graphs merely doubles the number of costs stored per graph vertex. They also show that the quality and efficiency of separator-based heuristics is similar for both types of graphs.

The present description of LSH dictates the storage of a binary code vector along with the vector of costs per vertex. While this is convenient, making for a very efficient computation of the heuristic in an online query (as shown and described for example in FIG. 4), it is not absolutely necessary, as the code may be easily reproduced online during the heuristic computation by a binary search-type procedure on the vertex coordinates.

The implementation of LSH uses a binary subdivision of the map bounding box, namely, at each recursive step the bounding box is partitioned into two along the geographic center of the box. While this one example of a subdivision method, in some applications it may be advantageous to subdivide the space differently.

An alternative subdivision would include, but is not limited to, partition along the median of the graph vertex count, namely at the point where half of the graph vertices would lie on either side of the partition. For graphs with non-uniform distribution of vertices over the map, this may be quite different from the geographic center of the box. This type of subdivision procedure has been tested as well as a number of other more sophisticated "adaptive" subdivision procedures leading to trees of non-uniform depth, but it was concluded that the difference in their performance was insignificant. Thus no reason was found to deviate from the simple LSH subdivision approach described above.

Another alternative is in the time complexity of the preprocessing stage. Currently it is (n log n), which may still be quite slow for dynamic traffic maps, in which the edge costs (i.e. travel times) change frequently, forcing the preprocessing to be repeated. It would be advantageous to use an efficient update procedure for the vertex cost vectors in the event of a few isolated changes to the edge weights.

The experiments run herein were done on modest road maps representing single states of the USA, containing a few million vertices. In the largest map—Colorado—a binary tree of depth 9 sufficed to achieve very good results. Since the tree depth scales logarithmically with the number of vertices in the map, a simple calculation shows that a tree of depth 12 would suffice to deal well with a map of the entire continental USA. Thus the present disclosed LSH is scalable to larger map areas.

In addition, depending on the implementation, the present invention's technology may utilize any number of separator trees. It is also within the scope of this invention to implement any direction of the separators and not just horizontal and/or vertical directions.

Generalized LSH

Figure 9A:
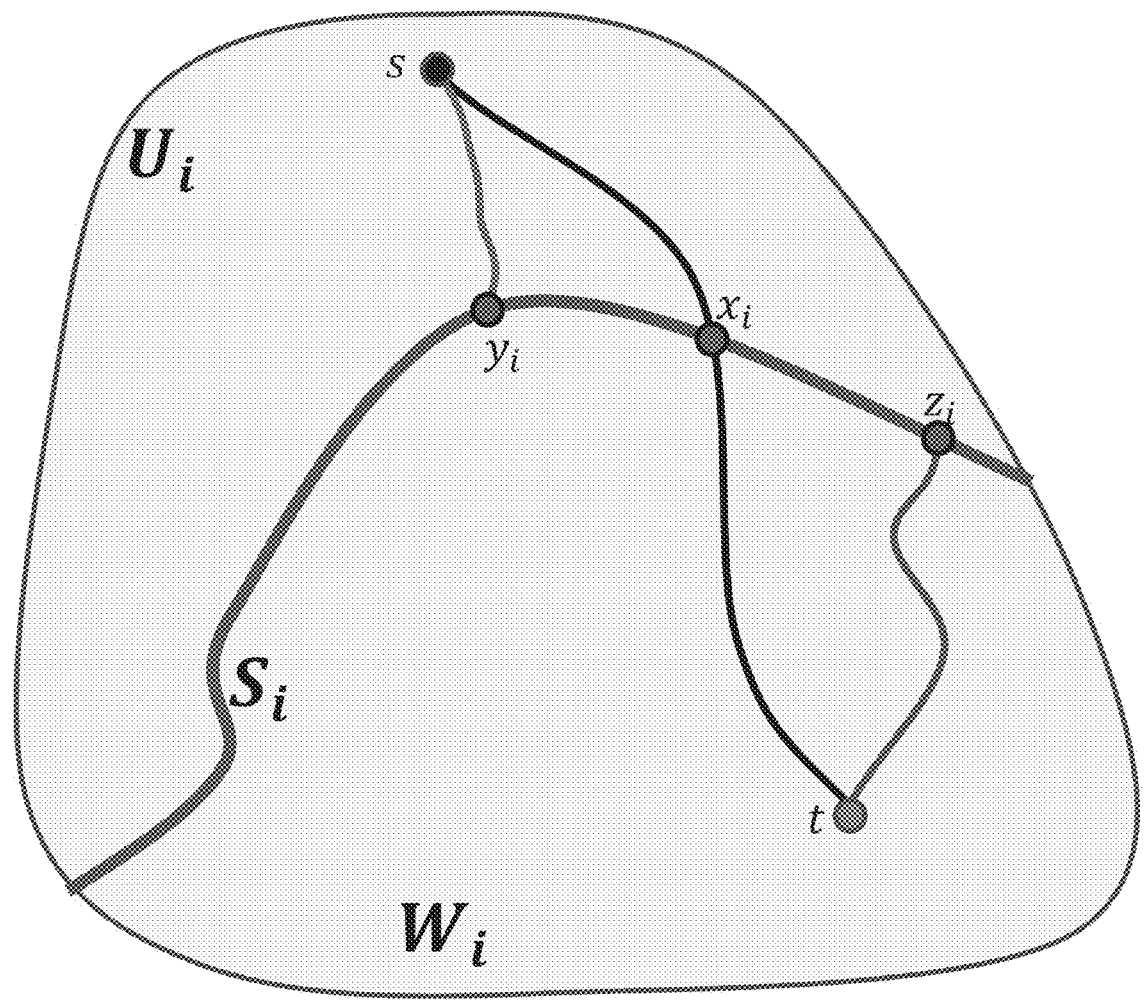
FIGS. 9A-9B are diagrams illustrating a generalized separator heuristic with either one or two segments per separator.
Figure 9B:
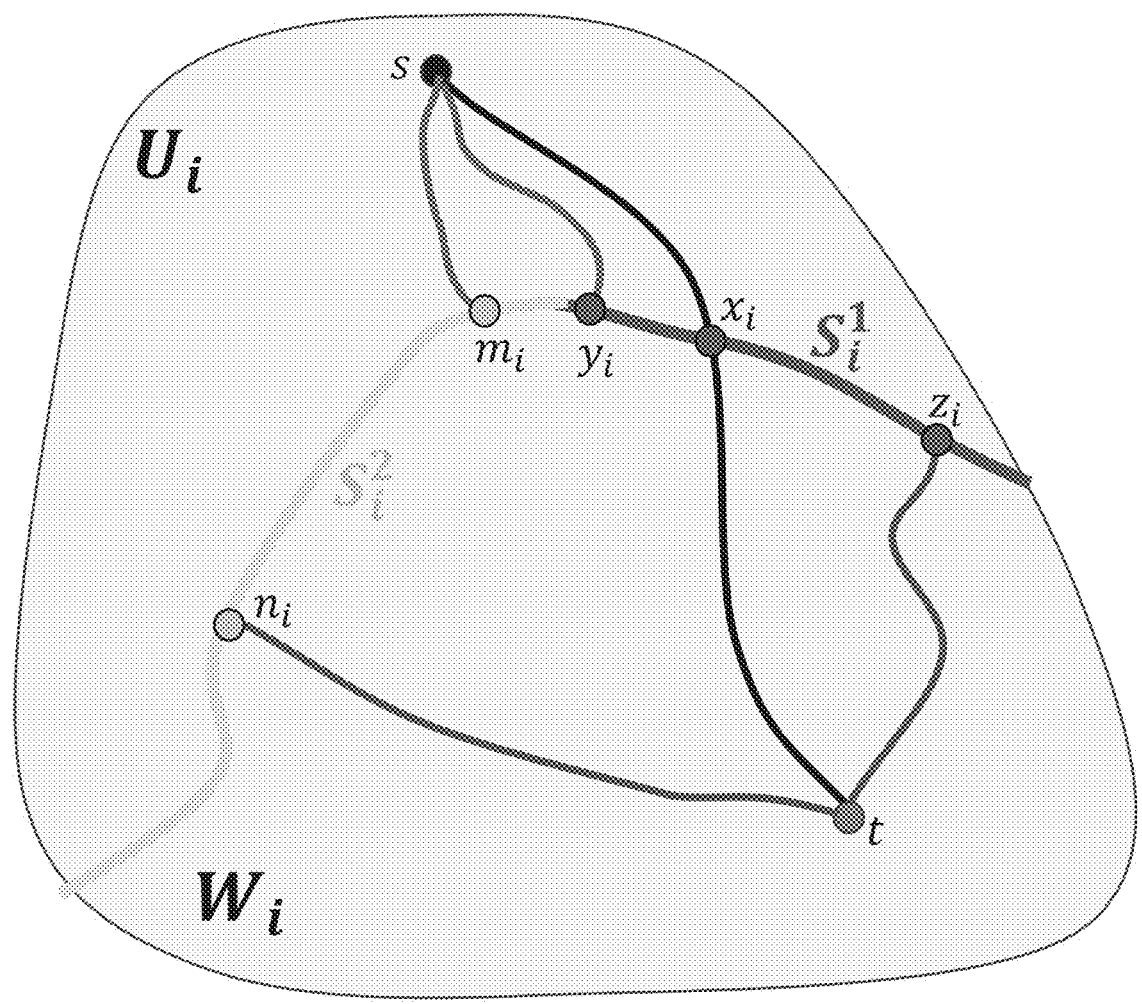

FIGS. 9A-9B illustrate a generalized separator-based heuristic used by A* to compute the fastest path in a map. The basic separator-based heuristic for the minimum cost (e.g. travel time) between two nodes in a network may be generalized by partitioning each of the separator into $k \geq 1$ segments. The heuristic value for the separator is the minimum of the heuristic values for each of the separator segments. This can only improve (i.e. increase) the heuristic, without damaging its admissibility, but the price to pay for this is multiplying the storage cost k per network node by a factor of k. So improving the heuristic by partitioning a separator to k segments should be compared to improving the heuristic by combining k different separators.

FIG. 9A gives an example of the Generalized LSH method. For a source point s, or starting point on a map and a target point t or ending point for the travel on the map, if $S_i$ separates $U_i$ from $W_i$ and $s \in U_i$ and $t \in W_i$ and is not partitioned (so k=1). Then the minimal-cost path must cross $S_i$ (at some $x_i$):

$$c(s, t) = c(s, x_i) + c(x_i, t)$$
$$\geq c(s, y_i) + c(z_i, t)$$
$$= c(s, S_i) + c(t, S_i)$$
$$= h_1^i(s, t)$$
$$= h_1(s, t)$$

Thus, $c(s, t) \geq h_1(s, t)$

If $S_i$ does not separate s and t, then method used is the generalized ALT heuristic for $S_i$.

In FIG. 9B, illustrated is the condition if $S_i$ is partitioned into k=2 segments $S_i^1$ and $S_i^2$:

$$c(s, t) = c(s, x_i) + c(x_i, t)$$
$$\geq \min\{c(s, y_i) + c(z_i, t), c(s, m_i) + c(n_i, t)\}$$
$$= \min\{c(s, S_i^1) + c(t, S_i^1), c(s, S_i^2) + c(t, S_i^2)\}$$
$$= \min\{h_2^1(s, t), h_2^2(s, t)\}$$
$$= h_2(s, t)$$

Thus, $c(s, t) \geq h_2(s, t) \geq h_1(s, t)$
For a general $k \geq 1$ partitions, $$c(s, t) \geq h_k(s, t) = \min_{1 \leq i \leq k} \{h_k^i(s, t)\}$$

A scenario where partitioning a separator into k segments is beneficial is where the separator is crossed by k highways. In this case it is best to partition the separator such that each segment contains one such highway crossing. This idea is similar to that used in the "2-hop" method to efficiently compute the exact distance between any two points in a road network. In practice, it is simplest just to uniformly partition the separators into k equal-length segments.

Improvements on the A* Algorithm

The A* algorithm operates using a priority queue. The implementation of this priority queue can greatly affect the efficiency of the algorithm. Typically a heap-type structure is used, which is the most general way to handle priorities which are real-valued. In the case that the priorities are travel times on roads, these travel times may be quantized to bounded integer values (e.g. measuring the travel times in tenths of seconds), allowing a more efficient implementation of the priority queue as a "bucket queue." In the design and analysis of data structures, a bucket queue (also called a bucket priority queue or bounded-height priority queue) is a priority queue for prioritizing elements whose priorities are small integers. It has the form of an array of buckets: an array data structure, indexed by the priorities, whose cells contain buckets of items with the same priority as each other.). In this implementation, insertions ("push") and deletions ("pop") from the queue require constant time, while finding the minimal element ("peek") may be a little more costly. This implementation of the priority queue of A* is preferable when computing the fastest-route.

The A* algorithm makes use of a priority queue of graph vertices, where the priority is determined by the heuristic function. Operations on the priority queue may be computationally expensive, even when a bucket queue is used, thus it is preferred to minimize the number of operations on the queue. During A*, when "expanding" a graph vertex, all vertex neighbors are examined and "pushed" onto the priority queue. A vertex is then "popped" off the priority queue to continue the search. When the heuristic is almost perfect (close to the true minimum cost—approximately less than 1% difference of the true value), the next node expanded at any given step will usually be one of the neighbors of the current minimal element of the priority queue. In this case, operations on the priority queue may be saved since there is no need to push this neighboring node in the priority queue only to immediately pop it. A simple comparison of the neighbors to the minimal element of the priority queue is sufficient to determine if this is the case, and then just push all neighbors which are not the one to be expanded (the one with the smallest cost).

The A* algorithm also uses a so-called "CLOSED" list to determine which network nodes have already been visited. This list data structure may be implemented in different ways in different algorithms. For the A* algorithm, it is best implemented using a bit-array whose length is the number of nodes in the network. All operations on this data structure are then done in constant time by examining or modifying the value of the corresponding bit.

The minimal cost values associated with a separator tree (and stored with the network) that are later used during the online queries to compute the A* heuristic are computed in a preprocessing step. The time required for this preprocessing is not critical, but should be accelerated if possible, since these values may need to be recomputed periodically in the case of a dynamic network (e.g. the travel times on road segments are changing due to evolving traffic conditions). Fortunately, due to the hierarchical subdivision nature of the separators, the values are computed independently on strips of network nodes. These may be computed in parallel in a multi-core computing environment, significantly speeding up the preprocessing phase.

Since the main cost of the heuristic A* algorithm is the storage of additional data per network node to support the efficient online computation of the heuristic, it is beneficial to efficiently encode this data (in as few bits and bytes as possible). This may be achieved by a simple predictor of the quantized integer values and entropy coding of the prediction error. A linear predictor is quite accurate and the resulting prediction errors may be coded in three bits less than the original (e.g. 10 bits) per value.

Generalizing the Separator Tree Heuristic by Rotation

Originally it was advocated herein the use of m=2 sets of separator trees for LSH: one vertical and one horizontal. The heuristic is computed as the maximal value of the heuristic produced by each individual separator tree. This can be generalized to $m \geq 2$ sets of separators, at uniform angles relative to the north direction. As in the previous generalization, this can only improve (i.e. increase) the final heuristic, without damaging its admissibility, but the price to pay is the storage cost of m separator trees per network node.

Quadtree Separator Heuristic (QSH)

Figure 10A:
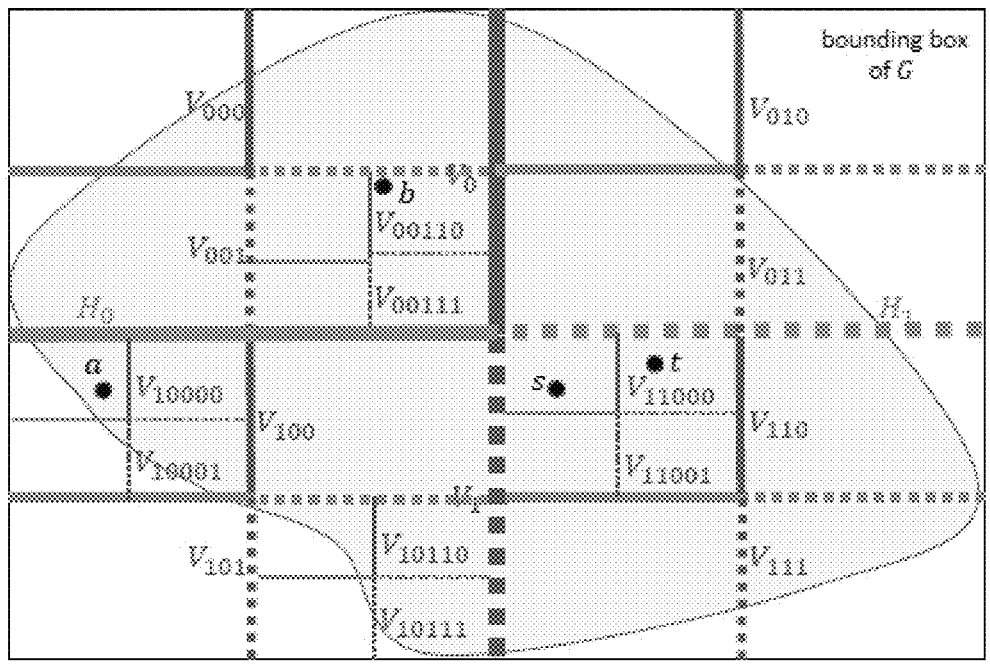
FIGS. 10A-10B are diagrams illustrating a three-level QSH construction with binary codes associated with sample vertices (a,b,s,t) in the map.
Figure 10B:
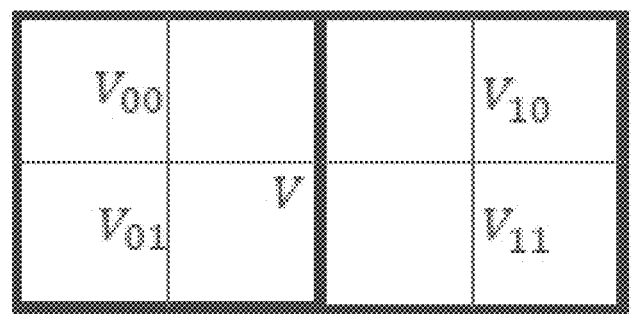

The LSH heuristic and its generalization independently partition the network along one dimension at a time. This is done once vertically, once horizontally, and once for any other desired angle. It is possible to provide a more natural partition that takes into account the intrinsic two-dimensional structure of a road network, using the data structure called the quadtree—which is a simultaneous two-dimensional recursive subdivision of the map into four quadrants, resulting in a different heuristic—QSH. FIGS. 10A-10B illustrate the quadtree construction. The blue region again is a geographical region of a map or the map itself depending on the implementation. In FIG. 10 A the map or domain is subdivided into a quadtree structure by two straight lines—one horizontal (green), and one vertical (red). Each such line consists of two segments (illustrated by the solid and dashed portions). Each quadrant is subdivided into four more at each level. The diagram illustrates the unique binary codes assigned to each of the resulting vertical and horizontal line segments shown in red and green, respectively. For each point in the domain, costs are stored to the relevant line segments, as defined by this quadtree structure. Each block of four sections or quadrants may either be further subdivided or remain depending on the embodiment.

Figure 11:
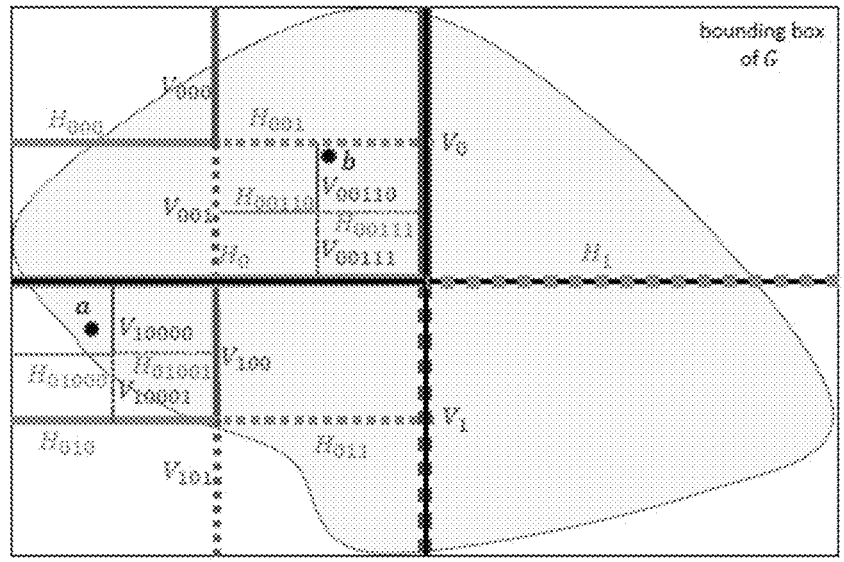
FIG. 11 are diagrams illustrating the QSH of FIG. 10A between vertices a and b where black lines denote the separator segments common to a and b.
Figure 12:
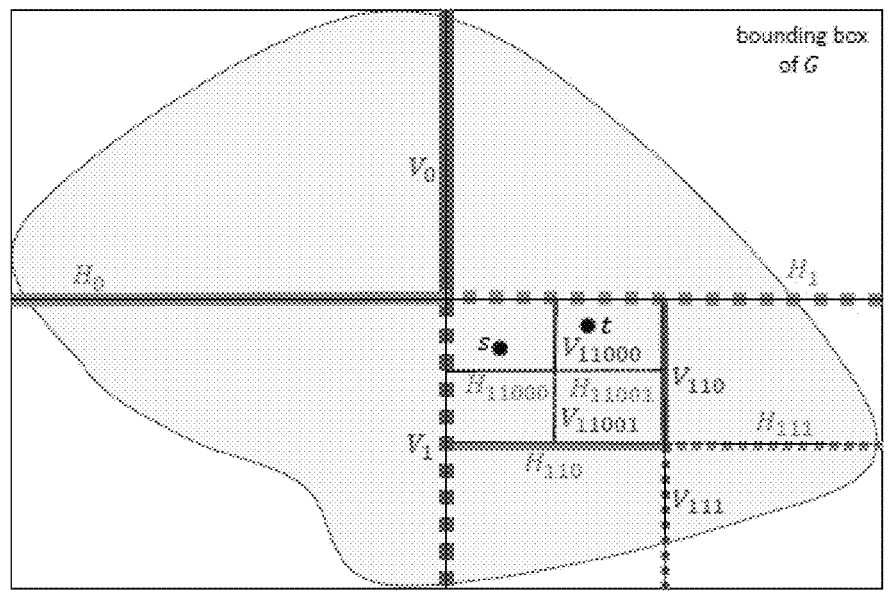
FIG. 12 are diagrams illustrating the QSH of FIG. 10A between vertices s and t where black lines denote the separator segments common to s and t.

FIGS. 11-12 illustrate the computation process of QSH and cost storage for select pairs of map points. For example, shown in FIG. 11, computation of h(a,b), where H denotes horizontal and V denotes vertical:

Point a: Costs are stored to $V_0$, $V_1$, $V_{100}$, $V_{101}$ $V_{10000}$, $V_{10001}$ $H_0$, $H_1$, $H_{010}$, $H_{011}$, $H_{01000}$, $H_{01001}$, and Point b: Costs are stored to $V_0$, $V_1$, $V_{000}$, $V_{001}$, $V_{00110}$, $V_{00111}$ $H_0$, $H_1$, $H_{000}$, $H_{001}$, $H_{00110}$, $H_{00111}$ Their intersection is the separator consisting of:

$V_0$, $V_1$ $H_0$, $H_1$

Shown in FIG. 12 is computation of h(s,t):

Point s: Costs are stored to $V_0$, $V_1$, $V_{110}$, $V_{111}$ $V_{11000}$, $V_{11001}$ $H_0$, $H_1$, $H_{110}$, $H_{111}$, $H_{11000}$, $H_{11001}$, and Point t: Costs are stored to $V_0$, $V_1$, $V_{110}$, $V_{111}$, $V_{11000}$, $V_{11001}$ $H_0$, $H_1$, $H_{110}$, $H_{111}$, $H_{11000}$, $H_{11001}$.

As shown in FIG. 12, their intersection is the separator consisting of:

$V_0$, $V_1$, $V_{110}$, $V_{111}$, $V_{11000}$, $V_{11001}$ $H_0$, $H_1$, $H_{110}$, $H_{111}$, $H_{11000}$, $H_{11001}$.

Separator Identification

Identifying the relevant separators, depending on the embodiment, may be done as follows. Given s and t, recursively subdivide the domain using the quadtree method until s and t are separated. At each level accumulate 4 line segments. The union of these accumulated line segments separates s and t. The heuristic cost h(s,t) is computed as the minimal sum of distances of s and t to each of the accumulated line segments.

Storage Complexity

The storage complexity, for QSH using a quadtree of depth k on the unit square, depending on the embodiment 4 costs are stored to segments of length $2^{-m}$ at level m, for a total of $4^k$ costs per point.

This storage complexity compared to the LSH method is as follows:
1. The LSH heuristic on a tree of depth k at two angles, where 2 costs are stored for segments of length 1 at level m, for a total of $2^k$ costs per point.
2. The generalized LSH heuristic on a tree of depth k at two angles, where partitioned is each separator to m segments of length $$\frac{1}{m},$$

for a total of 2mk costs per point.

Figure 13:
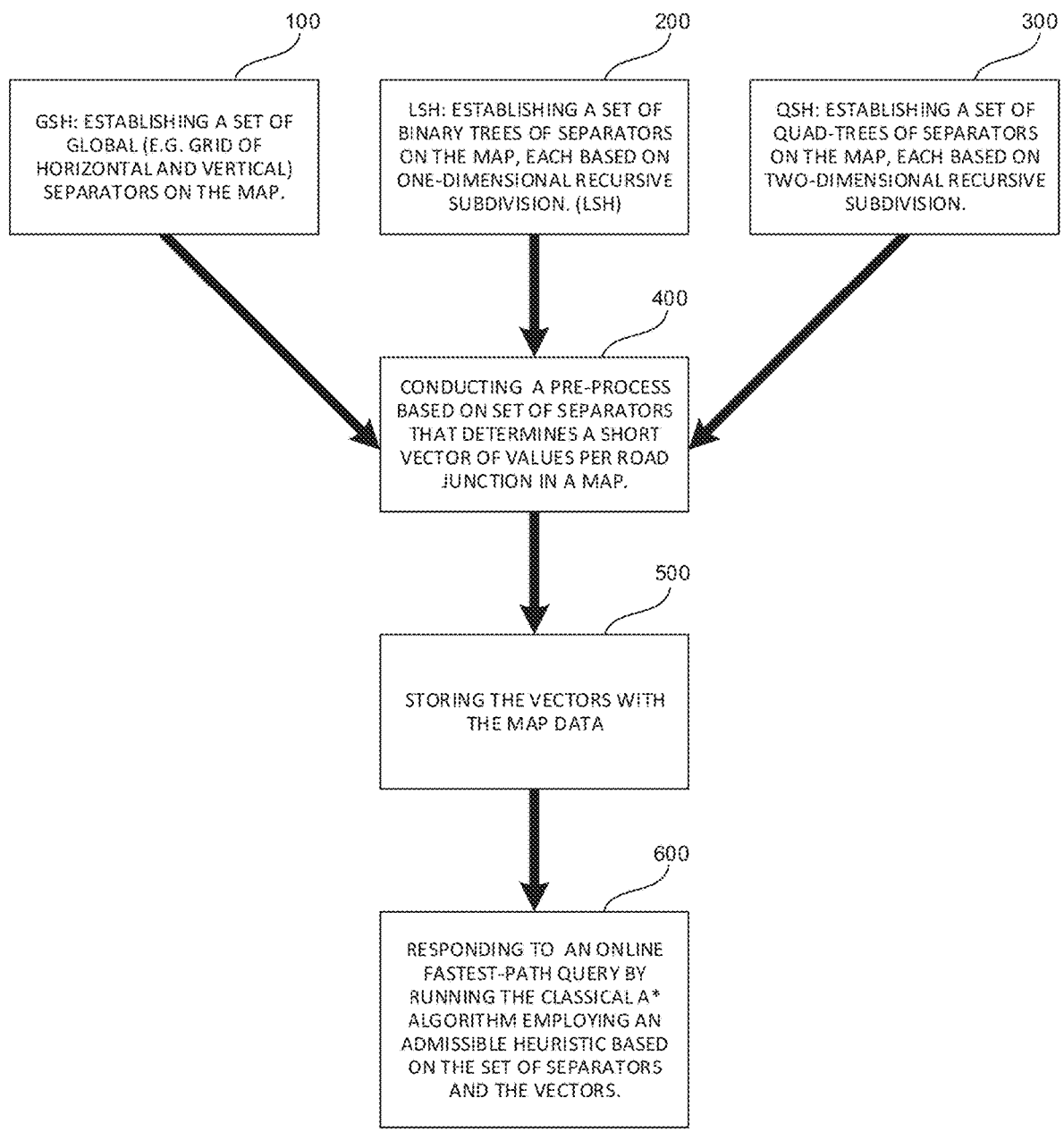
FIG. 13 is a block diagram showing an exemplified method using the A* with heuristic based on a set of separators.

FIG. 13 is a block diagram showing one embodiment of the methods. Step 100, 200 and 300 illustrate system and methods for using a set of separators, either an independent global set (GSH), a set of binary trees of separators (LSH), and a set of quadtrees of separators (QSH) on the map, respectively. Step 400 illustrates conducting a pre-process and pre-query activity that determines a vector of values per road junction in a map or domain. This step is done prior to any user entering a query. Step 500 shows storing these vector results for later use along with the map or domain. In step 600 a user enters a query and a response is given for a fast-path route from point s to point t, for example. Response to the user's query is done by running the A* algorithm using a heuristic function based on one of the above separator systems and methods to calculate the fastest path on the map and convey those results to the user.

Figure 14:
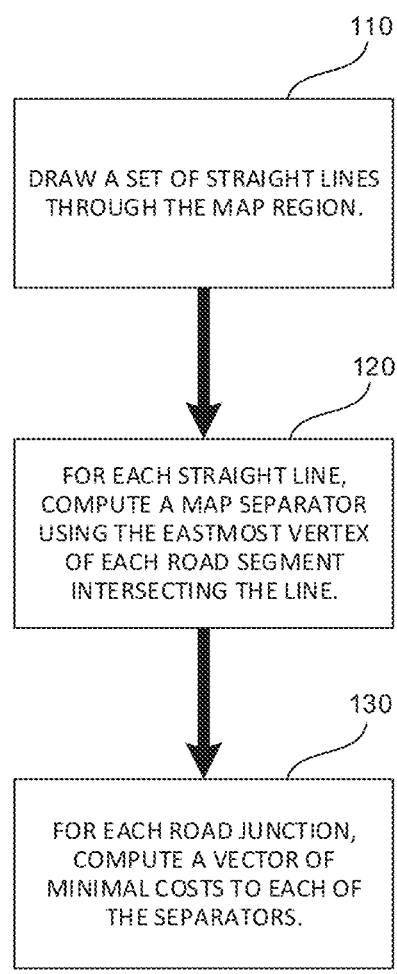
FIG. 14 is a block diagram showing an exemplified method of establishing a set of global separators (for GSH) on the map.

FIG. 14 illustrates one embodiment of establishing a set of global separators on the map for a Global Separator Heuristic (GSH). Step 110 shows drawing a set of straight lines through a map region. Step 120 shows for each straight line, determination of a map separator is done. This determination uses an east-most vertex of each road segment intersecting the drawn line. Step 130 illustrates for each road junction determining a vector of minimal costs to each of the separators. These steps are shown in the previous drawings and graphical pictures showing maps.

Figure 15:
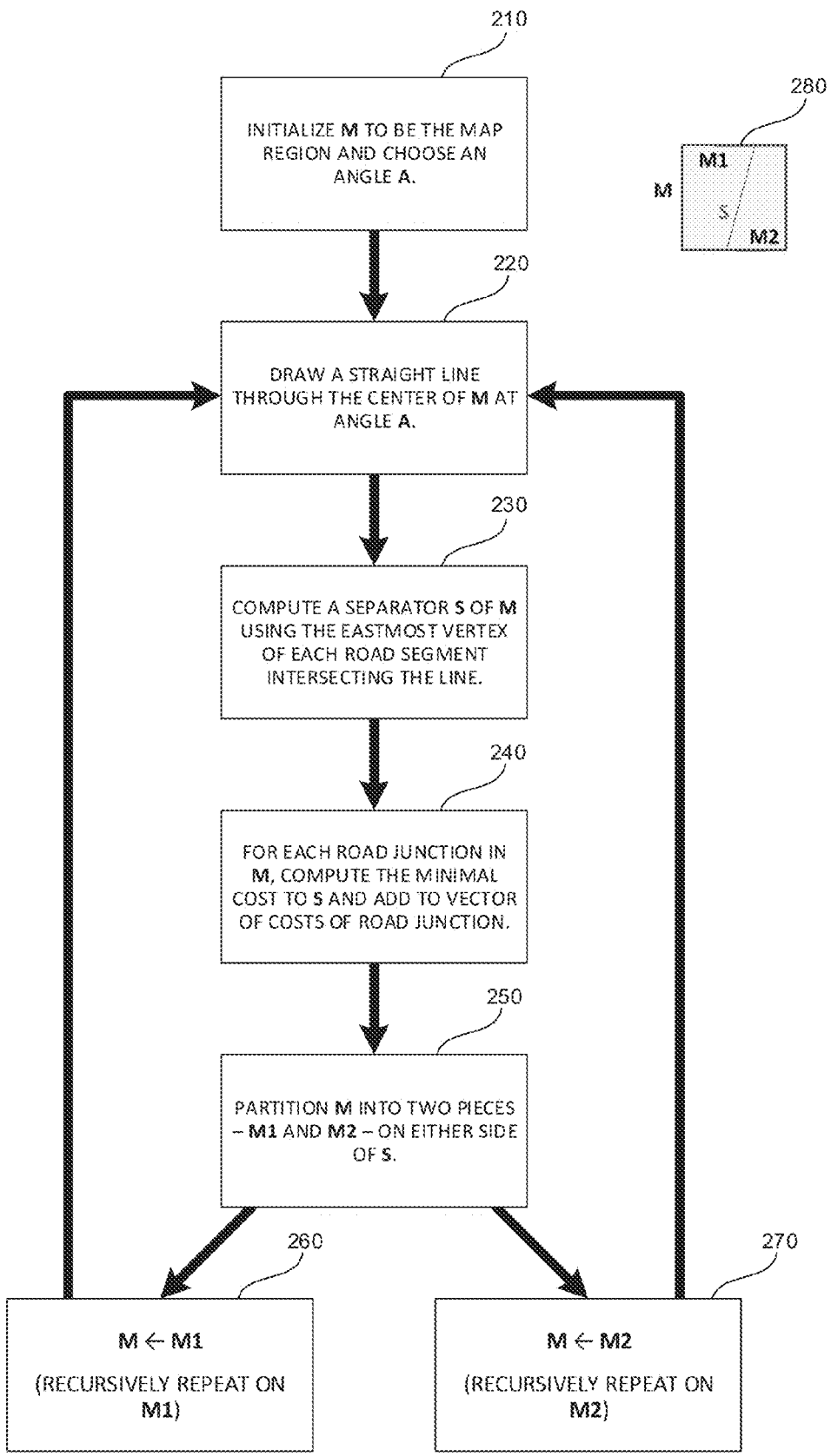
FIG. 15 is a block diagram showing an exemplified method of establishing a binary tree of separators (for LSH) on the map.

FIG. 15 illustrates one embodiment of establishing a binary tree of separators or a Local Separator Heuristic (LSH). As in the other methods, there is a pre-processing step performed even before a user enters any query. This pre-processing step determines a vector of values per road junction on a given map or domain. Determination of vectors may be based on a single separator or tree of separators creating bifurcation of the map based on the vertical and horizontal coordinates of the road junctions. In addition, depending on the implementation, determination of vectors may be based on a single separator or tree of separators creating bifurcation of the map vertically or horizontally (or at any other angle relative to the North). Step 210 illustrates initialization and choosing an angle of the line separator. An illustrative map is shown in 280 where the separator line S is at an angle A based on a horizontal axis to the line S. Line S separates map M into two sections M1 and M2. Step 220 illustrates drawing the line through the center of the map M at the angle A. Step 230 is a determination step of separator S of map M using the east most vertex of each road segment intersection the line S. Step 240 illustrates for each road junction in map M, a determination is made for the minimal cost to S and add to vector of costs of the road junction. Step 250 includes partition of M into two pieces—M1 and M2 on either side of the line S. For both M1 and M2, separately, steps 260 and 270 illustrate recursive repetition of drawing a straight line through the center but now on M1 and M2, respectively. The recursive process continues as shown in FIG. 15 until a pre-determined depth dmax as illustrated in FIG. 3.

Figure 16:
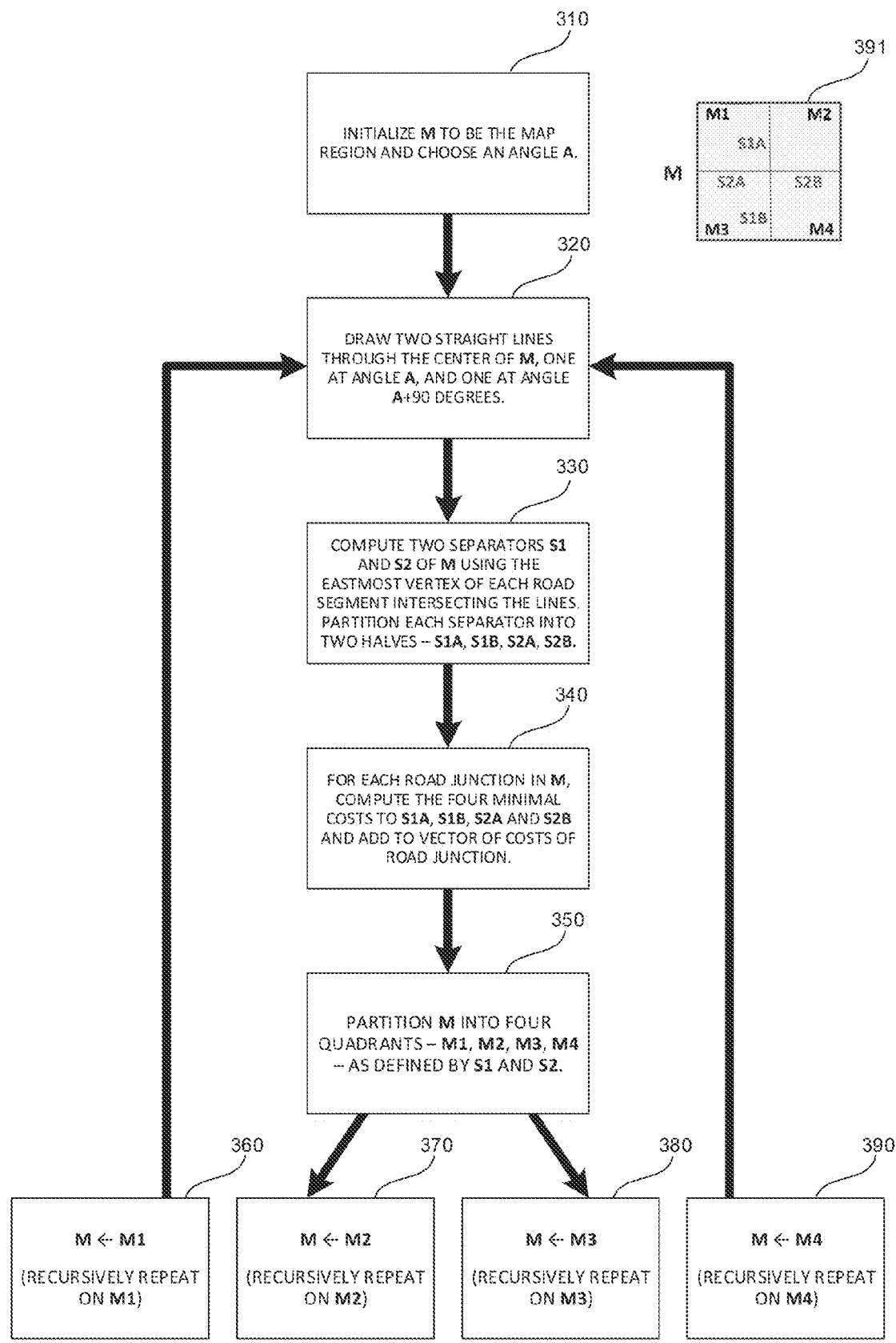
FIG. 16 is a block diagram showing an exemplified method of establishing a quadtree of separators (for QSH) on the map.

FIG. 16 illustrates a quadtree separator embodiment used for QSH. In this figure, as in the last methods, a pre-process and pre-query step is conducted to determine a vector of values per road junction on a map. Determination of vectors is done based on a quadtree structure that subdivides the map into a quadtree structure by line segments as shown in illustrative map 391. Again, the separators may be a single separator or a tree of separators creating at least four quadrants of the map based on the vertical and horizontal coordinates of the road junctions. There may be several of these four quadrant blocks formed in the map. Storing is done of the vector results with the map after this pre-process step.

When a user later submits a query, online or otherwise, for a fast path route between two points on a map, the query utilizes QSH to for a heuristic function for use in the A* algorithm. Step 310 illustrates initializing M to be a map region and choosing an angle A for lines S1 and S2. Shown in map 391 are 90 degree angles relative to the horizontal and vertical axis. Step 320 illustrates drawing the straight lines through the center of M at the angle A. Step 330 illustrates determining two separators S1 and S2 of M using the east most vertex of each road segment intersecting the lines S1 and S2. Each line is partitioned so each separator is divided into two halves S1A, S1B, S2A, and S2B. Step 340 illustrates for each road junction in M a determination is made for the four minimal costs to S1A, S1B, S2A, and S2B, and add to vector of costs of the road junction. Step 350 illustrates the partition of map M into four quadrants M1, M2, M3, and M4. Steps 360, 370, 380 and 390 all illustrate recursive steps for M1, M2, M3, and M4, respectively to further divide those map regions until a determination is made to stop the recursive step at some maximal depth. As with the other methods shown in FIGS. 14 and 15, the next step taken is as shown in FIG. 13, step 400 conducting a pre-process step of determination of short vectors followed by steps 500 and 600 that result in response to a query for producing the fastest path information to a user.

The disclosed depending on the embodiment maybe a system and/or arrangement of processes which create, monitor, and transform a pre-existing road map or other graph based on the utilization of one or more separators to determine the minimal costs of the fastest path on the roadmapo based on a user's query. Depending on the embodiment a new roadmap or graph may be generated utilizing the set of separators, The separators may or may not be formed at an angular orientation based on a pre-programmed determination or a user determination depending on the implementation.

Communication links are preferably data links. Such data link can alternatively be, but is not limited to, an electronic data link, optical fiber connection, wireless data connection, or any other known connection used for data transfer for example, over the internet as an email, text message, instant message, FTP transmission or the like, including any other communication. Depending upon the implementation, communication link can operate in one or more modes of transmission. For example, such modes include radio frequency transmissions, optical transmission, microwave transmission, digital or analog transmission, or other known data transmission.

The system and method may include a specialized machine such as a server. The server depicts a network, machine computer, processor, in communication with or including an image storage/retrieval system, or a database of content as described herein. The server, when specifically operating in accordance with the principles of the disclosed embodiment operates as a receiver, translator, processor, filter, storage, and distributor of content related data. The server receives content from content providers, responds to requests and administrator settings, and automatically processes data relating to the system transformation of the system managed interests. The server may be independent such as an off-site server, or its features may be incorporated into a computer site or into features offered by the present invention.

Depending on the embodiment, the teachings of the present disclosure may be utilized as a stand alone program or work in conjunction with pre-existing programs, for example other road map programs, to increase the efficiency of the previous programming, and achieve minimal cost objectives. In one embodiment, provided is a non-transitory computer-readable medium storing a program causing a computer to execute a process utilizing the teachings of the present disclosure. The process includes, but is not limited to, for example, a preprocessing step as previously described, accepting a user's query, retrieving the pre-processed information, and acquiring a fast path for the user.

The headings and sub-headings utilized in this description are not meant to limit the embodiments described thereunder. Features of various embodiments described herein may be utilized with other embodiments even if not described under a specific heading for that embodiment.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method for determining a scalable heuristic for fastest path determination on a map, comprising:
   constructing in a preprocess step a separator tree and storing the separator tree with a network, wherein the separator tree includes at least one node or a road junction of a roadmap;
   determining in the preprocess step at least one minimal cost value, and associating the value to the at least one node or the road junction for later use during an online query to compute a local separator heuristic (LSH) function; and
   responding to the online query by a user through utilization of both the stored separator tree and the heuristic function that is computed after the preprocess step to determine a fast path on the roadmap; and
   wherein, response to the online query is improved over a similar query utilizing a classical A* algorithm without the heuristic function when computing fastest paths.

2. The method of claim 1, wherein response to the online query further includes comparing binary codes of a pair of query vertices by using the local separator heuristic (LSH).

3. The method of claim 1, wherein response to the online query further includes compare binary codes of a pair of query vertices by using a quad tree heuristic.

4. The method of claim 1, further comprising:
   establishing a system of global separators or a grid of horizontal and vertical separators on the roadmap; or establishing a system of binary trees of separators on the roadmap, wherein each separator is based on a one-dimensional recursive subdivision; or establishing a system of quadtrees of separators on the road map, wherein, each separator is based on a two-dimensional recursive subdivision.

5. A non-transitory computer readable medium storing computer executable code, comprising a code for:

constructing in a preprocess step a separator tree and storing the separator tree with a network, wherein the separator tree includes at least one node or a road junction of a roadmap;

instructing in the preprocessing step to compute a a minimal cost value per road junction on a roadmap based on a set of separators and associating the value to the at least one node or the road junction for later use during an online query to compute a local separator heuristic (LSH) function;

storing the vectors of the preprocessing step with a map;

responding to the online query by a user through using the set of separators and stored vectors to compute the heuristic function and utilizing the set of separators and stored vectors, and the heuristic function that is computed after the preprocess step to determine a fast path on the roadmap; and wherein, response to the online query is improved over a similar query utilizing a classical A* algorithm without this heuristic when computing fastest paths.

6. The non-transitory computer readable medium of claim 5, further includes:

transmitting a fastest path to the user.

7. The non-transitory computer readable medium of claim 5, further includes:

implementing a binary tree heuristic or implementing a quadtree heuristic to determine a fastest path on the roadmap.

8. The non-transitory computer readable medium of claim 5, further includes:

scaling to provide an informed estimate of a fastest travel time between two vertices in the roadmap.

* * * * *